United States Patent [19]

Rieger et al.

[11] Patent Number: 5,409,637
[45] Date of Patent: Apr. 25, 1995

[54] NEMATIC LIQUID-CRYSTAL COMPOSITION

[75] Inventors: Bernhard Rieger, Yokohama; Hiroki Yoshitake; Atsushi Sawada, both of Atsugi, all of Japan; Herbert Plach, Darmstadt; Georg Weber, Erzhausen, both of Germany

[73] Assignee: Merck Patent Gesellschaft mit beschrankter Haftung, Darmstadt, Germany

[21] Appl. No.: 842,142

[22] PCT Filed: Feb. 11, 1992

[86] PCT No.: PCT/EP92/00291
§ 371 Date: Mar. 23, 1992
§ 102(e) Date: Mar. 23, 1992

[87] PCT Pub. No.: WO92/14800
PCT Pub. Date: Sep. 3, 1992

[30] Foreign Application Priority Data

Feb. 20, 1991 [EP] European Pat. Off. ........... 91102609

[51] Int. Cl.$^6$ .................... C09K 19/30; C09K 19/12
[52] U.S. Cl. ..................... 252/299.63; 252/299.66
[58] Field of Search ................ 252/299.63, 299.66

[56] References Cited

U.S. PATENT DOCUMENTS

| | | | |
|---|---|---|---|
| 4,710,315 | 12/1987 | Schad et al. | 252/299.63 |
| 4,871,469 | 10/1989 | Keiffenrath et al. | 252/299.61 |
| 4,886,621 | 12/1989 | Sage et al. | 252/299.61 |
| 4,923,632 | 5/1990 | Sawada et al. | 252/299.61 |
| 5,032,313 | 7/1991 | Goto et al. | 252/299.63 |
| 5,045,229 | 9/1991 | Bartmann et al. | 252/299.01 |
| 5,064,567 | 12/1991 | Funada et al. | 252/299.61 |
| 5,122,295 | 6/1992 | Weber et al. | 252/299.01 |
| 5,167,860 | 12/1992 | Sawada et al. | 252/299.63 |
| 5,171,469 | 12/1992 | Hittich et al. | 252/299.01 |
| 5,178,790 | 1/1993 | Weber et al. | 252/299.01 |

FOREIGN PATENT DOCUMENTS

3923044 4/1990 Germany .
9001056 2/1990 WIPO .

*Primary Examiner*—Gary Geist
*Assistant Examiner*—C. Harris
*Attorney, Agent, or Firm*—Millen, White, Zelano & Branigan

[57] ABSTRACT

The invention relates to a nematic liquid-crystal composition especially for active matrix displays with high voltage holding ratio, good low temperature stability and without reversed domains.

28 Claims, No Drawings

NEMATIC LIQUID-CRYSTAL COMPOSITION

The invention relates to nematic liquid-crystal compositions based on terminally and laterally fluorinated compounds. These compositions are useful for active and passive matrix application.

Active matrix displays (AMD) are highly favored for commercially interesting displays with a high information content. Such AMDs are used for TV application and also for displays with high information content for automobiles and airplanes.

AMDs have non-linear electrical switching elements which are integrated at each picture element. As non-linear driving elements thin film transistors (TFT) [Okubo, U., et al., 1982, SID 82 Digest, pp. 40-41] or diodes (e.g.: metal insulator metal: MIM) [Niwa, K., et al., 1984, SID 84, Digest, pp. 304-307] can be applied. These non-linear driving elements allow to use an electro-optical effect with a rather flat electro-optical characteristic if a good viewing angle characteristic can be obtained. So a TN-type LC cell [Schadt, M. and Halfrich, W., 1971, Appl. Phys. Lett., 18, 127] with a twist angle of 90° can be used. To provide the good contrast over a wide viewing angle, operation in the first minimum of: transmission [Pohl, L., Eidenschink, R., Pino, F. del., and Weber, G., 1980, German Pat., DBP 30 22 818, and 1981, U.S. Pat. No. 4 398 803; Pohl, L., Weber, G., Eidenschink, R., Baur, G., and Fehrenbach, W., 1981, Appl. Phys. Lett., 38, 497; Weber, G., Finkenzeller, U., Geelhaar, T., Plach, H. J., Rieger, B., and Pohl, L., 1988, Int. Symp. on Liq. Cryst., Freiburg, to be published in Liq. Crys.] is required. These AMDs are very well suited for TV applications and consequently are of high commercial interest. For these applications some physical properties of the liquid crystals become more important than for passive TN displays. Some of the decisive properties for the performance of an AMD are resistivity and stability of the liquid crystal [Togashi, S., Sekiguchi, K., Tanabe, H., Yamamoto, E., Sorimachi, K., Kajima, E., Watanabe, H., Shimuzu, H., Proc. Eurodisplay 84, Sept. 1984: A 210-288 Matrix LCD Controlled by Double Stage Diode Rings, p. 144 ff, Paris; Stromer, M., Proc. Eurodisplay 84, Sept. 1984: Design of Thin Film Transistors for Matrix Addressing of Television Liquid Crystal Displays, p. 145 ff, Paris].

In an AMD the non-linear switching elements are addressed in a multiplex scheme. So they charge the electrodes of a pixel in the limited time they are active. Then they become inactive until they are addressed again in the next cycle. Consequently the change of the voltage on an activated (charged) pixel is a nondesired but a very decisive feature of such a display. The discharge of a pixel is determined by two factors. They are the capacity of the electrodes of the pixel and resistivity of the dielectric material between the electrodes, namely the liquid crystal. The characteristic time constant of the decay of the voltage at a pixel (RC-time) has to be significantly bigger than the time between two adressing cycles (tadr.). A parameter frequently used to describe the performance of an AMD is the voltage holding ratio HR of a picture element:

$$HR = \frac{V(to) + V(to + tadr.)}{2 V(to)}$$

As the voltage at a pixle decays exponentially an increase of the holding ratio necessitates liquid crystal materials with exceptionally high resistivities.

There are several points of importance for the resistivity of the liquid crystal inside a display, e.g. orientation layers, curing condition of the orientation material. But by no means less important are the electrical properties of the liquid crystal used. Especially the resistivity of the liquid crystal in the display determines the magnitude of the voltage drop at the pixel.

Recently LC compositions with very good HR values could be obtained by using exclusively fluorinated compounds instead of the conventional LC compositions which are based on cyano compounds. Unfortunately, however, such LC compositions based on fluorinated compounds still pose severe problems. In many cases they tend to have lower pretilt angles than cyano based mixtures and they tend to show smectic phases and/or crystallization problems at low temperatures and it is also very difficult to realize very low threshold voltages without using cyano compounds. Finally the compositions based on fluorinated compounds show reverse domain phenomena (reverse tilt disclination) in many cases. One reason for this problem may reside in the relatively small surface tilt angle of the compositions compared to cyano LC based compositions. Another reason may also be the influence of the elastic constants and especially the $K_{22}$ value.

There is thus still a great need for liquid-crystal composition having a high resistivity and other suitable material properties for use in AMDs such as a broad nematic mesophase range with an extremely low transition temperature smecticnematic, no crystallization at low temperatures and being completely free of reverse domain phenomena (reverse tilt disclination).

The invention has for its object to provide a liquid-crystal composition with a very high resistivity which meets also the other demands.

Fluorinated compounds generally show a tendency towards lower pretilt angles than cyano compounds. Nevertheless, the present inventors found big differences of pretilt angles between different structures of fluorinated compounds. Some examples are given in the following table 1 which shows that fluorinated LCs can come close to the pretilt angles of cyano LCs.

TABLE 1

| Tilt Angles of Various Mixtures | | |
|---|---|---|
| Fluorinated[*1] | Tilt Angles (deg) | |
| compounds | J-1[*3] | J-2[*3] |
| L | 2.3 | 4.5 |
| M | 1.6 | 4.1 |
| N | 1.5 | 4.0 |
| O | 1.4 | 4.1 |
| P | 1.0 | 3.5 |
| Mix.X[*4] | 1.3 | 3.0 |
|  | 2.2 | 5.5 |

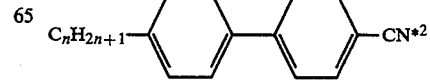

$C_nH_{2n+1}$—⟨⟩—⟨⟩—CN[*2]

TABLE 1-continued

Tilt Angles of Various Mixtures

| Fluorinated[*1] compounds | Tilt Angles (deg) | |
|---|---|---|
| | J-1[*3] | J-2[*3] |
| ZLI-3086 | 1.2 | 3.1 |

[*1]Each compound, L–P, is mixed with Mix.X in the ratio of 25:75.
[*2]This compound is mixed with ZLI-3086 (a sales item of E. Merck Darmstadt, Germany in the ratio of 25:75).
[*3]Low temp. baking type polyimides from Japan Synthetic Rubbers were used as alignment reagents.
[*4]Does not contain cyano components and consists of 15% of PCH-32, 15% of PCH-53, 20% of PCH-301, 15% of PCH-302, 15% of PCH-304, 6% of BCH-32, 6% of BCH-52, 4% of CBC-33F and 4% of CBC-53F.

The structures of fluorinated compounds used in Table 1

| Mark | Designation (Acronym) | Structure | Group |
|---|---|---|---|
| L | CCP-nOCF2.F.F | $C_nH_{2n+1}$—H—H—(F,F)—OCHF$_2$ | 3 |
| M | CUP-nF.F | $C_nH_{2n+1}$—H—(F,F)—(F)—F | 2 |
| N | ECCP-nF | $C_nH_{2n+1}$—H—H—$C_2H_4$—◯—F | 1 |
| O | ECCP-nF.F | $C_nH_{2n+1}$—H—H—$C_2H_4$—(F)—F | 1 |
| P | ECCP-nOCF3 | $C_nH_{2n+1}$—H—H—$C_2H_4$—◯—OCF$_3$ | 1 |

It has now been found that a nematic liquid-crystal composition based on terminally and laterally fluorinated compounds, characterized in that it comprises about 8 to 70% by weight of one or more compounds from group 1:

group 1: 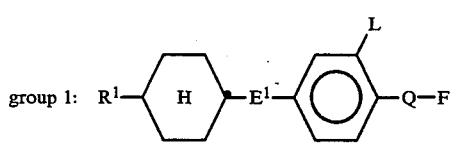

wherein $R^1$ denotes a straight-chain alkyl group of 2 to 5 carbon atoms, $E^1$ is

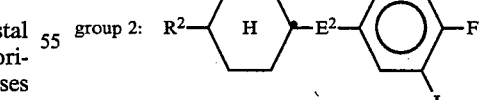

L is H or F and Q is OCF$_2$, OCFH, OCFC$_1$, CF$_2$ or a single bond, about 8 to 60% by weight of one or more compounds from group 2:

group 2: $R^2$—H—$E^2$—(L,L)—F wherein $R^2$ denotes a straight-chain alkyl group of 2 to 5 carbon atoms, $E^2$ is

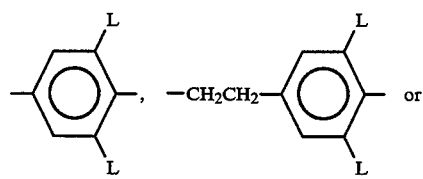

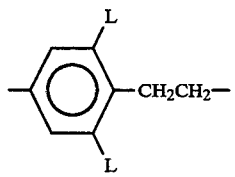

and each L is H or F, and/or about 8 to 40% by weight of one or more compounds from group 3:

group 3: 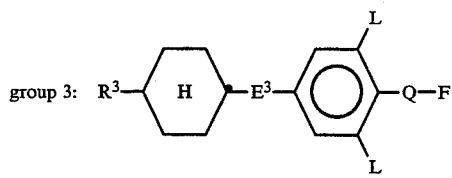

wherein R³ denotes a straight-chain alkyl group of 2 to 5 carbon atoms, E³ is

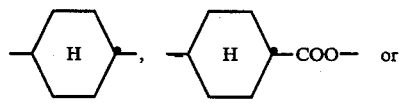

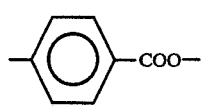

and Q and L are as defined above, with the proviso that both L are F if E³ is trans-1,4-cyclohexylene, is highly suited for AMD application. Very high RC time values can be obtained in AMDs. These compositions also show a reduced viscosity, allow operation in AMDs in the first minimum of transmission, do not exhibit any crystallization at −30° C. and are free of reverse domain problems (reverse tilt disclination). The latter being due to the very specific selection of fluorinated compounds which makes it possible to achieve fairly high pretilt angles.

Such compositions preferably contain two, three or four compounds from group 1. Preferred compositions comprise more than 12% by weight of one or more compounds from group 1.

The compounds from groups 1 to 3 are known from the European Patent Applns. 0 387 032 and 0 280 902, the European Patents 0 051 738 and 0 125 653, the International Patent Application WO 89/02884 and U.S. Pat. No. 4,302,352, U.S. Pat. No. 4,710,315 and U.S. Pat. No. 4,419,264 or can be prepared in analogy to known compounds.

Preferred compositions comprise simultaneously one or more compounds from each of groups 1a and 1b:

group 1a: 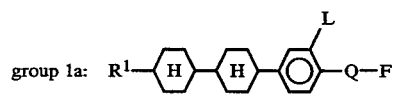

group 1b: 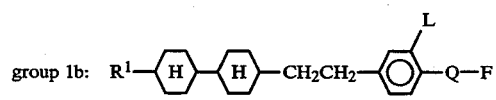

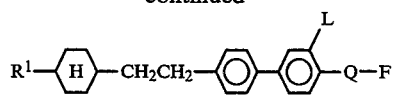

Preferably the compositions comprise one or more compounds from group 2 which are selected from the following formulae:

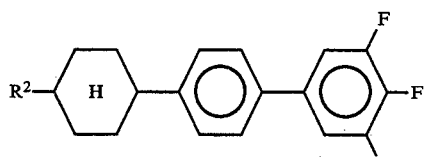

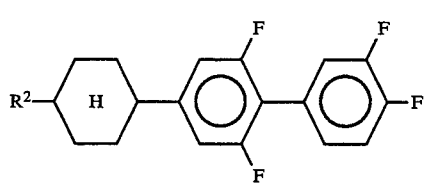

Preferably the compositions comprise one or more compounds from group 3 which are selective from the formula 3a to 3f:

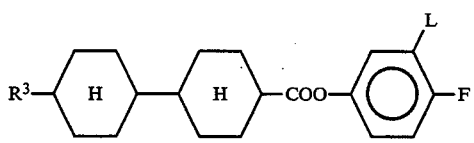

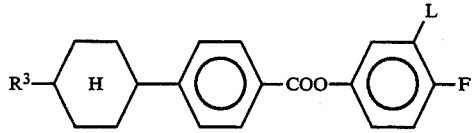

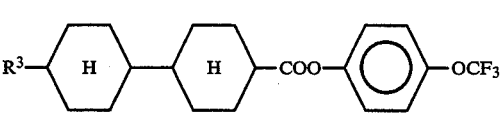

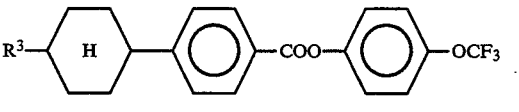

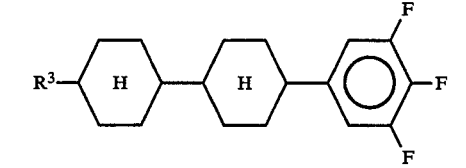

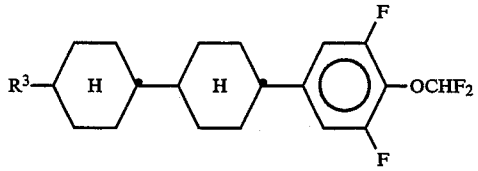

Preferred compounds from group 1 are those wherein L=F and Q=single bond (=subgroup 1'). However, compositions are especially preferred which contain also compounds from group 1 wherein Q is OCF$_2$, OCFH, OCFC$_1$ or CF$_2$ and L is H or F (=subgroup 1''). In subgroup 1'', Q is preferably OCF$_2$ or CF$_2$, OCF$_2$ being especially preferred. The weight ratio of components from subgroup 1' and subgroup 1'' is preferably ≧1. Especially preferred are compositions with subgroup 1'/subgroup 1''≧2:1. Of course also compositions are of particular importance which are mainly or even exclusively based on subgroup 1' components. Also preferred are compositions being based on subgroup 1' components which comprise simultaneously one or more compounds from each of groups 1 a and 1b.

Preferred compositions also comprise one or more compounds from group 0 having two rings:

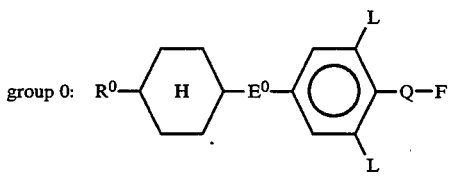

group 0:

where R$^0$ denotes a straight-chain alkyl group of 2 to 5 carbon atoms, E$^0$ is —(CH$_2$)$_4$—, —(CH$_2$)$_2$—, —CO—O— or a single bond an L and Q are as defined in group 1. Preferably E$^0$ is —(CH$_2$)$_2$— or a single bond, Q is a single bond and one of L is H and the other L is H or F.

The compositions according to this invention preferably comprise 30 to 60% by weight and especially 35 to 55% by weight of components from group 1. The preferred weight percent ranges for the other groups (if present) are as follows:
group 0: 5 to 30%, especially 10 to 25%
group 2: 12 to 40%, especially 15 to 25%
group 3: 12 to 30%, especially 15 to 25%

Preferably, the components from groups 1, 2 and 3 form the basis of the claimed compositions and constitute at least 60% (preferably at least 75%) by weigh of the compositions. It is, however, also possible to use besides components from groups 0 to 3 also other LC components in smaller percentages for fine-tuning the claimed compositions.

From many experimental investigations it also resulted that the most efficient compounds from group 2 are those of the formula

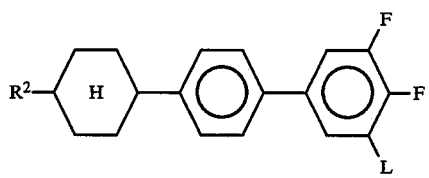

These components are preferably used in an amount of 18 to 30% by weight. Higher amounts are possible but do not further improve the "reverse domain" behavior.

The preparation of the compositions according to the invention is effected in the conventional manner. In general, the desired amount of the components which are used in the smaller amounts is dissolved in the component which constitutes the main constituent, preferably at elevated temperature. If this temperature is chosen to be above the clear point of the main constituent, the completeness of the process of dissolving can be observed particularly easily.

However, it is also possible to mix solutions of the components in a suitable organic solvent, for example acetone, chloroform or methanol, and to remove the solvent after thorough mixing, for example by distillation under reduced pressure. It is self-evident that with this method it must be ensured that the solvent does not introduce any contaminants or undesirable dopants.

By means of suitable additives the liquid crystal phases according to the invention can be modified in such a way that they can be used in any hitherto disclosed kind of AMD.

For the tilt angle measurement, we used crystal rotation method. Cell gap of all test cells used in this work was around 50 μm. Test cells were cells made of Soda lime+ITO by DNT with Polyimide orientation layer (Nissan Chemicals SE-150). Before tilt angle measurement, all test cells were heated up 20 minutes at 120° C. after filling LC mixtures as the isotropic treatment.

The examples below serve to illustrate the invention without limiting it. In the examples, the melting point and clear point of a liquid crystal substance are given in degrees Celsius. The percentages are by weight.

EXAMPLE 1

A liquid-crystal composition consisting of
11% of trans-1-p-fluorophenyl-4-n-pentylcyclohexane,
11% of trans-1-p-fluorophenyl-4-n-hexylcyclohexane,
14% of 1-[trans-4-(trans-4-pentylcyclohexyl)-cyclohexyl]-2-(3, 4 -difluorophenyl)-ethane,
14% of 1-[trans-4-(trans-4-propylcyclohexyl)-cyclohexyl]-2-(3, 4-difluorophenyl)-ethane,
7% of 1-[trans-4-(trans-4-n-propylcyclohexyl)-cyclohexyl]-2- (p-fluorophenyl)-ethane,
7% of 1-[trans-4-(trans-4-n-pentylcyclohexyl)-cyclohexyl]-2- (p-fluorophenyl)-ethane,
10% of 4'-(trans-4-n-propylcyclohexyl)-3, 4-difluorobiphenyl,
10% of 4'-(trans-4-n-pentylcyclohexyl)-3, 4-difluorobiphenyl,
8% of p-fluorophenyl trans-4-(trans-4-propylcyclohexyl)-cyclohexane carboxylate and
8% of p-fluorophenyl trans-4-(trans-4-pentylcyclohexyl)-cyclohexane carboxylate
shows a clearing point of 91° and a birefringence Δn of 0.0871. This composition can be stored at −30° without crystallization, shows a high resistivity in the order of 10$^{13}$ Ω·cm or more and is well suited for AMDs without reverse domain phenomena (tilt angle 4.7°).

EXAMPLE 2

A liquid crystal composition consisting of
8% of trans-1-p-fluorophenyl-4-n-pentylcyclohexane,
8% of trans-1-p-fluorophenyl-4-n-hexylcyclohexane,
5% of p-fluorophenyl-trans-4-(trans-4-propylcyclohexyl)-cyclohexane carboxylate,
5% of p-fluorophenyl-trans-4-(trans-4-pentylcyclohexyl)-cyclohexane carboxylate,
11% of 4'-(trans-4-propylcyclohexyl)-3,4-difluorobiphenyl,
11% of 4'-(trans-4-pentylcyclohexyl)-3,4-difluorobiphenyl,
6% of p-[trans-4-(trans-4-ethylcyclohexyl)-cyclohexyl]-trifluoromethoxybenzene,
5% of p-[trans-4-(trans-4-propylcyclohexyl)-cyclohexyl]-trifluoromethoxybenzene, 5% of p-[trans-4-(trans-4-butylcyclohexyl)-cyclohexyl]-trifluoromethoxybenzene,
5% of p-[trans-4-(trans-4-pentylcyclohexyl)-cyclohexyl]-trifluoromethoxybenzene,
13% of 1-[trans-4-(trans-4-propylcyclohexyl)-cyclohexyl]-2-(3,4-difluorophenyl)-ethane,
12% of 1-[trans-4-(trans-4-pentylcyclohexyl)-cyclohexyl]-2-(3,4-difluorophenyl)-ethane,
3% of 1-[trans-4-(trans-4-propylcyclohexyl)-cyclohexyl]-2-(p-fluorophenyl)-ethane and
3% of 1-[trans-4-(trans-4-pentylcyclohexyl)-cyclohexyl]-2-(p-fluorophenyl)-ethane shows a clearing point of 98° and a birefringence of 0.0917. This composition can be stored at −30° without crystallization, shows a high resistivity in the order of $10^{13}$ Ω·cm and is well suited for AMD's without reverse domain phenomena (tilt angle 4.2°).

EXAMPLE 3

A liquid crystal composition consisting of
11% of trans-1-p-fluorophenyl-4-n-pentylcyclohexane,
10% of trans-1-p-fluorophenyl-4-n-hexylcyclohexane,
10% of P-fluorophenyl-trans-4-(trans-4-propylcyclohexyl)-cyclohexane carboxylate,
10% of p-fluorophenyl-trans-4-(trans-4-pentylcyclohexyl)-cyclohexane carboxylate,
11% of 4'-(trans-4-propylcyclohexyl)-3,4-difluorobiphenyl,
11% of 4'-(trans-4-pentylcyclohexyl)-3,4-difluorobiphenyl,
3% of p-[trans-4-(trans-4-ethylcyclohexyl)-cyclohexyl]-trifluoromethoxybenzene,
3% of p-[trans-4-(trans-4-propylcyclohexyl)-cyclohexyl]-trifluoromethoxybenzene,
3% of p-[trans-4-(trans-4-butylcyclohexyl)-cyclohexyl]-trifluoromethoxybenzene,
3% of p-[trans-4-(trans-4-pentylcyclohexyl)-cyclohexyl]-trifluoromethoxybenzene,
13% of 1-[trans-4-(trans-4-propylcyclohexyl)-cyclohexyl]-2-(3, 4 -di fluorophenyl)-ethane and
12% of 1-[trans-4-(trans-4-pentylcyclohexyl)-cyclohexyl]-2-(3, 4-difluorophenyl)-ethane shows a clearing point of 93° and a birefringence of 0.0899. This composition can be stored at −30° without crystallization, shows a high resistivity in the order of $10^{13}$ Ω·cm and is well suited for AMD's without reverse domain phenomena (tilt angle 4.2°).

EXAMPLE 4

A liquid crystal composition consisting of
6% of trans-1-p-fluorophenyl-4-n-pentylcyclohexane,
8% of trans-1-p-fluorophenyl-4-n-hexylcyclohexane,
4% of trans-1-p-fluorophenyl-4-n-heptylcyclohexane,
11% of 4'-(trans-4-propylcyclohexyl)-3,4-difluorobiphenyl,
11% of 4'-(trans-4-pentylcyclohexyl)-3,4-difluorobiphenyl,
6% of p-[trans-4-(trans-4-ethylcyclohexyl)-cyclohexyl]-trifluoromethoxybenzene,
6% of p-[trans-4-(trans-4-propylcyclohexyl)-cyclohexyl]-trifluoromethoxybenzene,
6% of p-[trans-4-(trans-4-butylcyclohexyl)-cyclohexyl]-trifluoromethoxybenzene,
6% of p-[trans-4-(trans-4-pentylcyclohexyl)-cyclohexyl]-trifluoromethoxybenzene,
13% of 1-[trans-4-(trans-4-propylcyclohexyl)-cyclohexyl]-2-(3,4-difluorophenyl)-ethane,
13% of 1-[trans-4-(trans-4-pentylcyclohexyl)-cyclohexyl]-2-(3,4-di fluorophenyl)-ethane,
5% of 1-[trans-4-(trans-4-propylcyclohexyl)-cyclohexyl]-2-(p-fluorophenyl)-ethane and
5% of 1-[trans-4-(trans-4-pentylcyclohexyl)-cyclohexyl]-2-(p-fluorophenyl)-ethane shows a clearing point of 90° and a birefringence of 0.0900. This composition can be stored at −30° without crystallization, shows a high resistivity in the order of $10^{13}$ Ω·cm and is well suited for AMD's without reverse domain phenomena (tilt angle 3.9°).

EXAMPLE 5

A liquid crystal composition consisting of
10% of trans-1-p-fluorophenyl-4-n-pentylcyclohexane,
8% of trans-1-p-fluorophenyl-4-n-hexylcyclohexane,
6% of trans-1-p-fluorophenyl-4-n-heptylcyclohexane,
5% of p-trifluoromethoxyphenyl-trans-4-(trans-4-propylcyclohexyl)-cyclohexane carboxylate,
5% of p-trifluoromethoxyphenyl-trans-4-(trans-4-pentylcyclohexyl)-cyclohexane carboxylate,
12% of 4'-(trans-4-propylcyclohexyl)-3,4-difluorobiphenyl,
10% of 4'-(trans-4-pentylcyclohexyl)-3,4-difluorobiphenyl,
8% of p-[trans-4-(trans-4-ethylcyclohexyl)-cyclohexyl]-trifluoromethoxybenzene,
12% of p-[trans-4-(trans-4-propylcyclohexyl)-cyclohexyl]-trifluoromethoxybenzene,
7% of p-[trans-4-(trans-4-butylcyclohexyl)-cyclohexyl]-trifluoromethoxybenzene,
11% of p-[trans-4-(trans-4-pentylcyclohexyl)-cyclohexyl]-trifluoromethoxybenzene,
2% of 4,4'-bis-(trans-4-propylcyclohexyl)-2-fluorobiphenyl,
2% of 4,4'-bis-(trans-4-pentylcyclohexyl)-2-fluorobiphenyl and
2% of 4-(trans-4-pentylcyclohexyl)-4'-(trans-4-propylcyclohexyl)-2-fluorobiphenyl shows a clearing point of 96° and a birefringence of 0.094. This composition can be stored at −30° without crystallization, shows a high resistivity in the order of $10^{13}$ Ω·cm and is well suited for AMD's without reverse domain phenomena (tilt angle 4.2°).

EXAMPLE 6

A liquid crystal composition consisting of
10% of trans-1-p-fluorophenyl-4-n-pentylcyclohexane,
8% of trans-1-p-fluorophenyl-4-n-hexylcyclohexane,
6% of trans-1-p-fluorophenyl-4-n-heptylcyclohexane,
5% of 3,4-difluorophenyl-(trans-4-propylcyclohexylethyl)-benzoate,
5% of 3,4-difluorophenyl-(trans-4-pentylcyclohexylethyl)-benzoate,
12% of 4'-(trans-4-propylcyclohexyl)-3,4-difluorobiphenyl,
10% of 4'-(trans-4-pentylcyclohexyl)-3,4-difluorobiphenyl,
8% of p-[trans-4-(trans-4-ethylcyclohexyl)-cyclohexyl]-trifluoromethoxybenzene,
12% of P-[trans-4-(trans-4-propylcyclohexyl)-cyclohexyl]-trifluoromethoxybenzene,
7% of P-[trans-4-(trans-4-butylcyclohexyl)-cyclohexyl]-trifluoromethoxybenzene,
11% of P-[trans-4-(trans-4-pentylcyclohexyl)-cyclohexyl]-trifluoromethoxybenzene,
2% of 4,4'-bis-(trans-4-propylcyclohexyl)-2-fluorobiphenyl, 2% of 4,4'-bis-(trans-4-pentylcyclohexyl)-2-fluorobiphenyl and 2% of 4-(trans-4-pentylcyclohexyl)-4'-(trans-4-propylcyclohexyl)2-fluorobiphenyl shows a clearing point of 98° and a birefringence of 0.101. This composition can be stored at −30° without crystallization, shows a high resistivity in the order of $10^{13}$ Ω·cm and is well suited for AMD's without reverse domain phenomena.

In the present application and in the examples below, the structures of the liquid-crystal compounds are indicated by acronyms, with the transformation into chemical formulae taking place in accordance with Tables A and B below. All radicals $C_nH_{2n+1}$ and $C_mH_{2m+1}$ are straight-chain alkyl radicals containing n or m carbon atoms. The coding in Table B is self-evident. In Table A, only the acronym for the base structure is given. In individual cases, the acronym for the base structure is followed, separated by a hyphen, by a code for the substitutents $R^1$, $R^2$, $L^1$, $L^2$ add $L^3$.

| Code für $R^1, R^2,$ $L^1, L^2, L^3$ | $R^1$ | $R^2$ | $L^1$ | $L^2$ | $L^3$ |
|---|---|---|---|---|---|
| nm | $C_nH_{2n+1}$ | $C_mH_{2m+1}$ | H | H | H |
| nOm | $C_nH_{2n+1}$ | $OC_mH_{2m+1}$ | H | H | H |
| nO.m | $OC_nH_{2n+1}$ | $C_mH_{2m+1}$ | H | H | H |
| n | $C_nH_{2n+1}$ | CN | H | H | H |
| nN.F | $C_nH_{2n+1}$ | CN | H | F | H |
| nF | $C_nH_{2n+1}$ | F | H | H | H |
| nOF | $OC_nH_{2n+1}$ | F | H | H | H |
| nCl | $C_nH_{2n+1}$ | Cl | H | H | H |
| nF.F | $C_nH_{2n+1}$ | F | H | F | H |
| nOmFF | $C_nH_{2n+1}$ | $OC_mH_{2m+1}$ | F | F | H |
| nMF | $C_nH_{2n+1}$ | $C_mH_{2m+1}$ | F | H | H |
| nCF3 | $C_nH_{2n+1}$ | CF3 | H | H | H |
| nOCF3 | $C_nH_{2n+1}$ | OCF3 | H | H | H |
| nOCF2 | $C_nH_{2n+1}$ | OCHF2 | H | H | H |
| nS | $C_nH_{2n+1}$ | NCS | H | H | H |
| rVsN | $C_rH_{2r+1}$—CH=CH—$C_sH_{2s}$— | CN | H | H | H |
| rEsN | $C_rH_{2r+1}$—O—$C_sH_{2s}$— | CN | H | H | H |
| nNF | $C_nH_{2n+1}$ | CN | F | H | H |
| nAM | $C_nH_{2n+1}$ | $COOC_mH_{2m+1}$ | H | H | H |
| nF.F.F | $C_nH_{2n+1}$ | F | H | F | F |
| nCl.F.F | $C_nH_{2n+1}$ | Cl | H | F | F |
| nCF3.F.F | $C_nH_{2n+1}$ | CF3 | H | F | F |
| nOCF3.F.F | $C_nH_{2n+1}$ | OCF3 | H | F | F |
| nOCF2.F.F | $C_nH_{2n+1}$ | OCHF2 | H | F | F |
| nOCF3.F | $C_nH_{2n+1}$ | OCF3 | H | F | H |

TABLE A

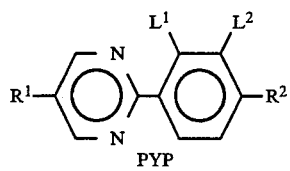
PYP

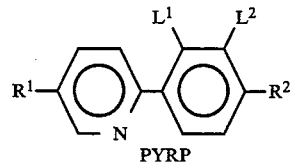
PYRP

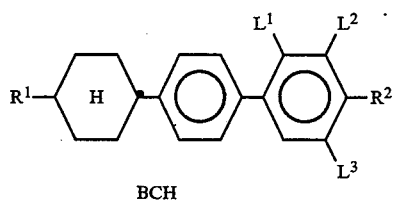
BCH

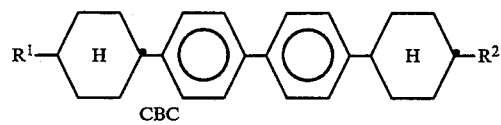
CBC

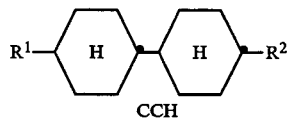
CCH

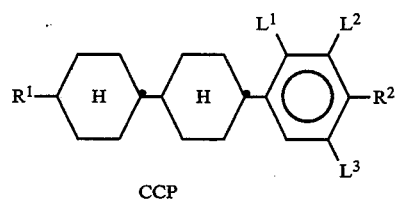
CCP

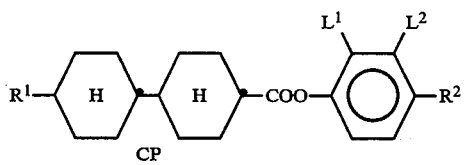
CP

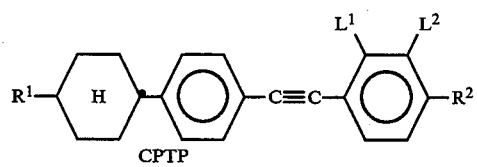
CPTP

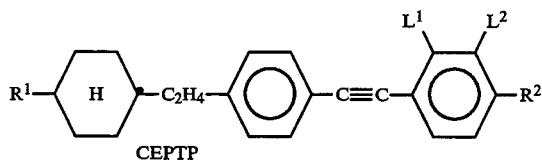
CEPTP

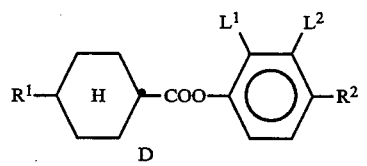
D

TABLE A-continued
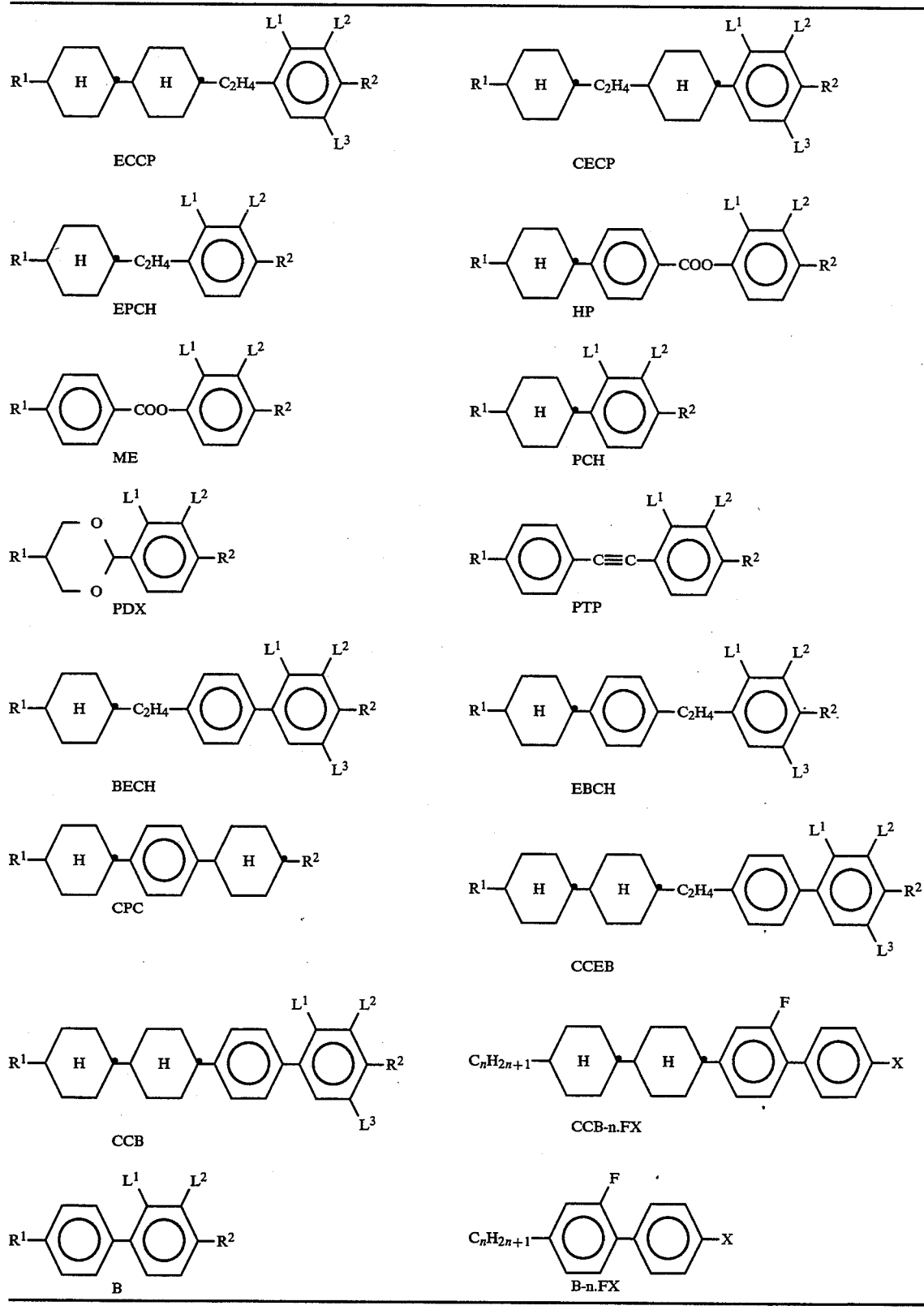
TABLE B
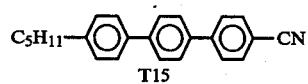
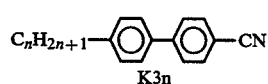

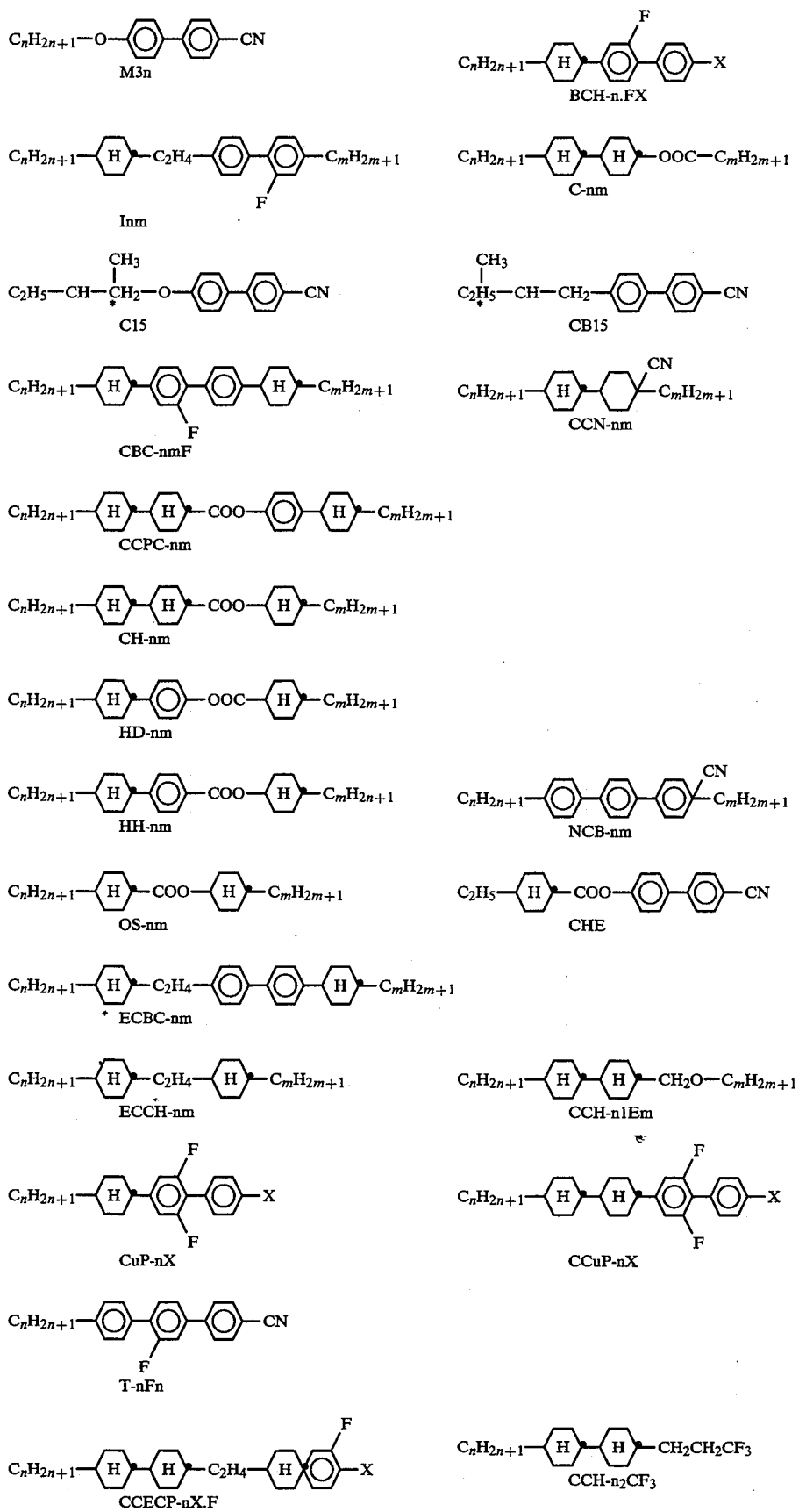

TABLE B-continued

CCP-nF.F.F.

BCH-nF.F.F

CCH-nmCF3

EXAMPLE 7

| | |
|---|---|
| S → N [°C.] | <40 |
| Clearing point [°C.] | +103 |
| Viscosity (mm²s⁻¹) 20° C. | 21 |
| Δn (589 nm, 20° C.) | +0.0848 |
| $n_e$ (589 nm, 20° C.) | 1.5559 |
| $V_{(10,0,20)}$ [V] | 1.81 |
| $V_{(50,0,20)}$ [V] | 2.24 |
| $V_{(90,0,20)}$ [V] | 2.83 |
| Composition [%]: | PCH-5F 5.0 |
| | PCH-7F 5.0 |
| | CCP-20CF3 8.0 |
| | CCP-30CF3 9.0 |
| | CCP-50CF3 9.0 |
| | ECCP-3F.F 11.0 |
| | ECCP-5F.F 10.0 |
| | CUP-3F.F 5.0 |
| | CUP-5F.F 4.0 |
| | CCP-30CF2.F.F 8.0 |
| | CCP-50CF2.F.F 14.0 |
| | CP-30CF3 6.0 |
| | CP-50CF3 6.0 |

EXAMPLE 8

| | |
|---|---|
| S → N [°C.] | <−40 |
| Clearing point [°C.] | +99 |
| Viscosity [mm²s⁻¹] 20° C. | 23 |
| Δn (589 nm, 20° C.) | +0.0960 |
| $n_e$ (589 nm, 20° C.) | 1.5751 |
| $V_{(10,0,20)}$ [V] | 1.79 |
| $V_{(50,0,20)}$ [V] | 2.21 |
| $V_{(90,0,20)}$ [V] | 2.81 |
| Composition [%]: | PCH-5F 6.0 |
| | PCH-7F 6.0 |
| | CCP-20CF3 6.0 |
| | CCP-30CF3 8.0 |
| | CCP-50CF3 7.0 |
| | ECCP-3F.F 11.0 |
| | ECCP-5F.F 11.0 |
| | BCH-3F.F 6.0 |
| | CUP-3F.F 7.0 |
| | CUP-5F.F 6.0 |
| | CCP-30CF2.F.F 7.0 |
| | CCP-50CF2.F.F 11.0 |
| | CBC-33F 4.0 |
| | CBC-55F 4.0 |

EXAMPLE 9

| | |
|---|---|
| S → N [°C.] | — |
| Clearing point [°C.] | +93 |
| Viscosity [mm²s⁻¹] 20° C. | 21 |
| Δn (589 nm, 20° C.) | +0.0772 |
| $n_e$ (589 nm, 20° C.) | 1.5478 |
| $V_{(10,0,20)}$ [V] | 1.82 |
| $V_{(50,0,20)}$ [V] | 2.16 |
| $V_{(90,0,20)}$ [V] | 2.78 |
| Composition [%]: | PCH-5F 6.0 |

-continued

| | |
|---|---|
| CCH-301 | 6.0 |
| CCH-303 | 5.0 |
| CCH-501 | 6.0 |
| CCP-20CF3 | 6.0 |
| CCP-30CF3 | 7.0 |
| CCP-40CF3 | 6.0 |
| CCP-50CF3 | 7.0 |
| ECCP-3F.F | 7.0 |
| ECCP-5F.F | 8.0 |
| CUP-3F.F | 3.0 |
| CUP-5F.F | 4.0 |
| CCP-30CF2.F.F | 11.0 |
| CCP-50CF2.F.F | 12.0 |
| CP-30CF3 | 7.0 |

EXAMPLE 10

| | |
|---|---|
| Clearing point [°C.] | +102 |
| Viscosity [mm²s⁻¹] 20° C. | — |
| Δn (589 nm, 20° C.) | +0.0970 |
| $n_e$ (589 nm, 20° C.) | 1.5808 |
| $V_{(10,0,20)}$ [V] | 2.15 |
| $V_{(50,0,20)}$ [V] | 2.57 |
| $V_{(90,0,20)}$ [V] | 3.15 |
| Composition [%]: | PCH-7F 14.00 |
| | CCP-20CF3 5.00 |
| | CCP-30CF3 5.00 |
| | CCP-40CF3 5.00 |
| | CCP-50CF3 5.00 |
| | CCP-30CF3 5.00 |
| | CCP-50CF3 5.00 |
| | BCH-3F.F 14.00 |
| | BCH-5F.F 14.00 |
| | ECCP-3F 5.00 |
| | ECCP-5F 5.00 |
| | ECCP-3F.F 9.00 |
| | ECCP-5F.F 9.00 |

EXAMPLE 11

| | |
|---|---|
| Clearing point [°C.] | +102 |
| Viscosity [mm²s⁻¹] 20° C. | 20 |
| Δn (589 nm, 20° C.) | +0.0952 |
| $n_e$ (589 nm, 20° C.) | 1.5791 |
| $V_{(10,0,20)}$ [V] | 2.05 |
| $V_{(50,0,20)}$ [V] | 2.51 |
| $V_{(90,0,20)}$ [V] | 3.13 |
| Composition [%]: | PCH-7F 11.00 |
| | CCP-20CF3 5.00 |
| | CCP-30CF3 5.00 |
| | CCP-40CF3 5.00 |
| | CCP-50CF3 5.00 |
| | CCP-30CF2.F.F 5.00 |
| | CCP-50CF2.F.F 5.00 |
| | BCH-3F.F 12.00 |
| | BCH-5F.F 12.00 |
| | ECCP-3F 8.00 |
| | ECCP-5F 7.00 |
| | ECCP-3F.F 10.00 |

|  |  |  |
|---|---|---|
| ECCP-5F.F | 10.00 |  |

EXAMPLE 12

| Clearing point [°C.] | +73 |  |
|---|---|---|
| Viscosity [mm²s⁻¹] 20° C. | — |  |
| Δn (589 nm, 20° C.) | +0.0879 |  |
| $n_e$ (589 nm, 20° C.) | 1.5688 |  |
| $V_{(10,0,20)}$ [V] | 1.56 |  |
| $V_{(50,0,20)}$ [V] | 1.88 |  |
| $V_{(90,0,20)}$ [V] | 2.32 |  |
| Composition [%]: | PCH-5F | 8.00 |
|  | PCH-7F | 8.00 |
|  | CCP-20C-73 | 5.00 |
|  | CCP-30CF3 | 6.00 |
|  | CCP-40CF3 | 6.00 |
|  | CCP-50CF3 | 6.00 |
|  | ECCP-3F.F | 5.00 |
|  | ECCP-5F.F | 5.00 |
|  | BCH-3F.F.F | 14.00 |
|  | BCH-5F.F.F | 13.00 |
|  | CCP-3F.F.F | 9.00 |
|  | CCP-5F.F.F | 9.00 |

EXAMPLE 13

| Clearing point [°C.] | 95 |  |
|---|---|---|
| Viscosity [mm²s⁻¹] 20° C. | — |  |
| Δn (589 nm, 20° C.) | 0.089 |  |
| $n_e$ (589 nm, 20° C.) | 1.567 |  |
| $V_{(10,0,20)}$ [V] | 1.97 |  |
| $V_{(50,0,20)}$ [V] | — |  |
| $V_{(90,0,20)}$ [V] | 2.86 |  |
| Composition [%]: | CP-30CF3 | 10.00 |
|  | CP-50CF3 | 10.00 |
|  | PCH-5F | 8.00 |
|  | PCH-6F | 7.00 |
|  | PCH-7F | 6.00 |
|  | CCP-20CF3 | 7.00 |
|  | CCP-30CF3 | 7.00 |
|  | CCP-40CF3 | 7.00 |
|  | CCP-50CF3 | 7.00 |
|  | ECCP-3F.F | 5.00 |
|  | ECCP-5F.F | 5.00 |
|  | BCH-3F.F | 11.00 |
|  | BCH-5F.F | 10.00 |

EXAMPLE 14

| Clearing point [°C.] | +93 |  |
|---|---|---|
| Viscosity [mm²s⁻¹] 20° C. | — |  |
| Δn (589 nm, 20° C.) | +0.0899 |  |
| $n_e$ (589 nm, 20° C.) | 1.5765 |  |
| $V_{(10,0,20)}$ [V] | 2.02 |  |
| $V_{(50,0,20)}$ [V] | 2.43 |  |
| $V_{(90,0,20)}$ [V] | 3.00 |  |
| Composition [%]: | PCH-5F | 11.00 |
|  | PCH-6F | 10.00 |
|  | CP-3F | 10.00 |
|  | CP-5F | 10.00 |
|  | BCH-3F.F | 11.00 |
|  | BCH-5F.F | 11.00 |
|  | CCP-20CF3 | 3.00 |
|  | CCP-30CF3 | 3.00 |
|  | CCP-40CF3 | 3.00 |
|  | CCP-50CF3 | 3.00 |
|  | ECCP-3F.F | 13.00 |
|  | ECCP-5F.F | 12.00 |

EXAMPLE 15

| Clearing point [°C.] | +100 |  |
|---|---|---|
| Viscosity [mm²s⁻¹] 20° C. | — |  |
| Δn (589 nm, 20° C.) | +0.0971 |  |
| $n_e$ (589 nm, 20° C.) | 1.5823 |  |
| $V_{(10,0,20)}$ [V] | 1.99 |  |
| $V_{(50,0,20)}$ [V] | 2.43 |  |
| $V_{(90,0,20)}$ [V] | 2.96 |  |
| Composition [%]: | PCH-7F | 12.00 |
|  | CCP-20CF3 | 5.00 |
|  | CCP-30CF3 | 5.00 |
|  | CCP-40CF3 | 5.00 |
|  | CCP-50CF3 | 5.00 |
|  | CCP-30CF2.F.F | 3.00 |
|  | CCP-50CF2.F.F | 3.00 |
|  | BCH-3F.F | 14.00 |
|  | BCH-5F.F | 14.00 |
|  | ECCP-3F | 7.00 |
|  | ECCP-5F | 7.00 |
|  | ECCP-3F.F | 10.00 |
|  | ECCP-5F.F | 10.00 |

EXAMPLE 16

| S → N [°C.] | <−40 |  |
|---|---|---|
| Clearing point [°C.] | +100 |  |
| Viscosity [mm²s⁻¹] 20° C. | 19 |  |
| Viscosity [mm²s⁻¹] 0° C. | 55 |  |
| Viscosity [mm²s⁻¹] −20° C. | 276 |  |
| Viscosity [mm²s⁻¹] −30° C. | 767 |  |
| Viscosity [mm²s⁻¹] −40° C. | 2609 |  |
| Δn (589 nm, 20° C.) | +0.0929 |  |
| $n_e$ (589 nm, 20° C.) | 1.5722 |  |
| $V_{(10,0,20)}$ [V] | 1.95 |  |
| $V_{(50,0,20)}$ [V] | 2.33 |  |
| $V_{(90,0,20)}$ [V] | 2.86 |  |
| Composition [%]: | PCH-5F | 6.00 |
|  | PCH-6F | 3.00 |
|  | PCH-7F | 5.00 |
|  | BCH-3F.F | 9.00 |
|  | BCH-5F.F | 6.00 |
|  | CCP-20CF3 | 8.00 |
|  | CCP-30CF3 | 9.00 |
|  | CCP-40CF3 | 5.00 |
|  | CCP-50CF3 | 8.50 |
|  | ECCP-3F.F | 8.50 |
|  | ECCP-5F.F | 8.50 |
|  | ECCP-30CF3 | 2.50 |
|  | CUP-3F.F | 3.50 |
|  | CUP-5F.F | 3.00 |
|  | CCP-30CF2.F.F | 3.50 |
|  | CCP-50CF2.F.F | 5.50 |
|  | CBC-33F | 3.00 |
|  | CBC-53F | 2.50 |

EXAMPLE 17

| S → N [°C.] | — |  |
|---|---|---|
| Clearing point [°C.] | 83 |  |
| Viscosity [mm²s⁻¹] 20° C. | — |  |
| Δn (589 nm, 20° C.) | 0.0884 |  |
| $n_e$ (589 nm, 20° C.) | 1.5635 |  |
| $V_{(10,0,20)}$ [V] | 1.41 |  |
| $V_{(50,0,20)}$ [V] | — |  |
| $V_{(90,0,20)}$ [V] | 2.44 |  |
| Composition [%]: | PCH-6F | 4.00 |
|  | PCH-7F | 9.00 |
|  | CCP-20CF3 | 5.00 |
|  | CCP-30CF3 | 5.00 |
|  | CCP-40CF3 | 5.00 |
|  | CCP-50CF3 | 5.00 |
|  | ECCP-3F.F | 5.00 |
|  | ECCP-5F.F | 5.00 |
|  | BCH-3F.F | 5.00 |
|  | BCH-5F.F | 5.00 |

-continued

| | |
|---|---|
| CUP-3F.F | 6.00 |
| CUP-5F.F | 6.00 |
| CCP-30CF2.F.F | 15.00 |
| CCP-50CF2.F.F | 20.00 |

EXAMPLE 18

| | | |
|---|---|---|
| S → N [°C.] | — | |
| Clearing point [°C.] | +83 | |
| Viscosity [mm²s⁻¹] 20° C. | — | |
| Δn (589 nm, 20° C.) | +0.0970 | |
| n_e (589 nm, 20° C.) | 1.5753 | |
| V₍₁₀,₀,₂₀₎ [V] | 1.61 | |
| V₍₅₀,₀,₂₀₎ [V] | 1.93 | |
| V₍₉₀,₀,₂₀₎ [V] | 2.37 | |
| Composition [%]: | PCH-6F | 3.00 |
| | PCH-7F | 9.00 |
| | CCP-20CF3 | 5.00 |
| | CCP-30CF3 | 5.00 |
| | CCP-40CF3 | 5.00 |
| | CCP-50CF3 | 5.00 |
| | BCH-3F.F | 10.00 |
| | BCH-5F.F | 10.00 |
| | CUP-3F.F | 6.00 |
| | CUP-5F.F | 6.00 |
| | CCP-30CF2.F.F | 15.00 |
| | CCP-50CF2.F.F | 20.00 |
| | CBC-33F | 1.00 |

EXAMPLE 19

| | | |
|---|---|---|
| S → N [°C.] | — | |
| Clearing point [°C.] | +83 | |
| Viscosity [mm²s⁻¹] 20° C. | 18 | |
| Viscosity [mm²s⁻¹] 0° C. | 51 | |
| Viscosity [mm²s⁻¹] −20° C. | 248 | |
| Viscosity [mm²s⁻¹] −30° C. | 693 | |
| Viscosity [mm²s⁻¹] −40° C. | 2515 | |
| Δn (589 nm, 20° C.) | +0.0885 | |
| n_e (589 nm, 20° C.) | 1.5680 | |
| V₍₁₀,₀,₂₀₎ [V] | 1.72 | |
| V₍₅₀,₀,₂₀₎ [V] | 3.10 | |
| V₍₉₀,₀,₂₀₎ [V] | 2.62 | |
| Composition [%]: | PCH-5F | 6.00 |
| | PCH-6F | 6.00 |
| | PCH-7F | 6.00 |
| | CCP-20CF3 | 8.00 |
| | CCP-30CF3 | 7.00 |
| | CCP-50CF3 | 7.00 |
| | ECCP-3F.F | 10.00 |
| | ECCP-5F.F | 10.00 |
| | CCP-30CF2.F.F | 10.00 |
| | CCP-50CF2.F.F | 10.00 |
| | BCH-3F.F | 10.00 |
| | BCH-5F.F | 10.00 |

EXAMPLE 20

| | | |
|---|---|---|
| S → N [°C.] | — | |
| Clearing point [°C.] | +76 | |
| Viscosity [mm²s⁻¹] 20° C. | 21 | |
| Viscosity [mm²s⁻¹] 0° C. | 64 | |
| Δn (589 nm, 20° C.) | +0.0900 | |
| n_e (589 nm, 20° C.) | 1.5665 | |
| V₍₁₀,₀,₂₀₎ [V] | 1.59 | |
| V₍₅₀,₀,₂₀₎ [V] | 1.92 | |
| V₍₉₀,₀,₂₀₎ [V] | 2.37 | |
| Composition [%]: | PCH-7F | 10.00 |
| | CCH-303 | 9.00 |
| | CCP-20CF3 | 8.00 |
| | CCP-30CF3 | 8.00 |
| | CCP-50CF3 | 8.00 |
| | BCH-3F.F | 8.00 |
| | BCH-5F.F | 8.00 |
| | CUP-3F.F | 8.00 |
| | CUP-5F.F | 8.00 |
| | CCP-30CF2.7.F | 10.00 |
| | CCP-50CF2-7.F | 15.00 |

EXAMPLE 21

| | | |
|---|---|---|
| S → N [°C.] | — | |
| Clearing point [°C.] | +92 | |
| Δn (589 nm, 20° C.) | +0.0928 | |
| n_e (589 nm, 20° C.) | 1.5736 | |
| V₍₁₀,₀,₂₀₎ [V] | 1.68 | |
| V₍₅₀,₀,₂₀₎ [V] | 2.02 | |
| V₍₉₀,₀,₂₀₎ [V] | 2.53 | |
| Composition [%]: | PCH-5F | 4.00 |
| | PCH-7F | 4.00 |
| | CCP-20CF3 | 7.00 |
| | CCP-30CF3 | 7.00 |
| | CCP-40CF3 | 7.00 |
| | CCP-50CF3 | 8.00 |
| | ECCP-3F.F | 8.00 |
| | ECCP-5F.F | 8.00 |
| | BCH-3F.F.F | 14.00 |
| | BCH-5F.F.F | 13.00 |
| | CCP-3F.F.F | 9.00 |
| | CCP-5F.F.F | 9.00 |
| | CBC-33F | 2.00 |

EXAMPLE 22

| | | |
|---|---|---|
| S→N [°C.] | — | |
| Clearing point [°C.] | +77 | |
| Δn (589 nm, 20° C.) | +0.0893 | |
| n_e (589 nm, 20° C.) | 1.5704 | |
| V₍₁₀,₀,₂₀₎ [V] | 1.49 | |
| V₍₅₀,₀,₂₀₎ [V] | 1.81 | |
| V₍₉₀,₀,₂₀₎ [V] | 2.22 | |
| Composition [%]: | PCH-5F | 8.00 |
| | PCH-7F | 6.00 |
| | CCP-20CF3 | 6.00 |
| | CCP-30CF3 | 7.00 |
| | CCP-40CF3 | 6.00 |
| | CCP-50CF3 | 6.00 |
| | ECCP-3F.F | 8.00 |
| | ECCP-5F.F | 8.00 |
| | BCH-3F.F.F | 14.00 |
| | BCH-5F.F.F | 13.00 |
| | CCP-3F.F.F | 9.00 |
| | CCP-5F.F.F | 9.00 |

EXAMPLE 23

| | | |
|---|---|---|
| S→N [°C.] | — | |
| Clearing point [°C.] | +86 | |
| Δn (589 nm, 20° C.) | +0.0954 | |
| n_e (589 nm, 20° C.) | 1.5728 | |
| V₍₁₀,₀,₂₀₎ [V] | 1.59 | |
| V₍₅₀,₀,₂₀₎ [V] | 1.94 | |
| V₍₉₀,₀,₂₀₎ [V] | 2.41 | |
| Composition [%]: | PCH-6F | 3.00 |
| | PCH-7F | 7.00 |
| | CCP-20CF3 | 5.00 |
| | CCP-30CF3 | 5.00 |
| | CCP-40CF3 | 5.00 |
| | CCP-50CF3 | 5.00 |
| | ECCP-3F.F | 5.00 |
| | BCH-3F.F | 9.00 |
| | BCH-5F.F | 9.00 |
| | CUP-3F.F | 6.00 |
| | CUP-5F.F | 6.00 |
| | CCP-30CF2.F.F | 15.00 |

-continued

| | | |
|---|---|---|
| CCP-50CF2.F.F | 20.00 | |

EXAMPLE 24

| | | |
|---|---|---|
| S→N [°C.] | — | |
| Clearing point [°C.] | +81 | |
| Viscosity [mm²s⁻¹] 20° C. | 23 | |
| Δn (589 nm, 20° C.) | +0.0914 | |
| $n_e$ (589 nm, 20° C.) | 1.5684 | |
| $V_{(10,0,20)}$ [V] | 1.64 | |
| $V_{(50,0,20)}$ [V] | 1.97 | |
| $V_{(90,0,20)}$ [V] | 2.41 | |
| Composition [%]: | PCH-7F | 8.00 |
| | CCH-303 | 8.00 |
| | CCP-20CF3 | 7.00 |
| | CCP-30CF3 | 7.00 |
| | CCP-50CF3 | 7.00 |
| | BCH-3F.F | 9.00 |
| | BCH-5F.F | 10.00 |
| | CCP-3F.F | 7.00 |
| | CCP-5F.F | 7.00 |
| | CCP-30CF2.F.F | 15.00 |
| | CCP-50CF2.F.F | 15.00 |

EXAMPLE 25

| | | |
|---|---|---|
| S→N [°C.] | — | |
| Clearing point [°C.] | +92 | |
| Δn (589 rim, 20° C.) | +0.0969 | |
| $n_e$ (589 nm, 20° C.) | 1.5684 | |
| $V_{(10,0,20)}$ [V] | 1.69 | |
| $V_{(50,0,20)}$ [V] | 2.06 | |
| $V_{(90,0,20)}$ [V] | 2.55 | |
| Composition [%]: | PCH-6F | 6.00 |
| | PCH-7F | 6.00 |
| | CCP-20CF3 | 4.00 |
| | CCP-30CF3 | 4.00 |
| | CCP-50CF3 | 4.00 |
| | BCH-3F.F | 6.00 |
| | BCH-5F.F | 6.00 |
| | ECCP-3F.F | 8.00 |
| | ECCP-5F.F | 8.00 |
| | CUP-3F.F | 8.00 |
| | CUP-5F.F | 8.00 |
| | CCP-30CF3.F.F | 10.00 |
| | CCP-50CF2.F.F | 15.00 |
| | CBC-33F | 3.00 |
| | CBC-55F | 4.00 |

EXAMPLE 26

| | | |
|---|---|---|
| S→N [°C.] | — | |
| Clearing point | +92 | |
| Δn (589 nm, 20°C.) | +0.0929 | |
| $n_e$ (589 nm, 20° C.) | 1.5694 | |
| $V_{(10,0,20)}$ [V] | 1.80 | |
| $V_{(50,0,20)}$ [V] | 2.18 | |
| $V_{(90,0,20)}$ [V] | 2.66 | |
| Composition [%]: | HP-30CF3 | 5.00 |
| | HP-50CF3 | 5.00 |
| | CP-30CF3 | 8.00 |
| | CP-50CF3 | 8.00 |
| | PCH-5F | 8.00 |
| | PCH-6F | 8.00 |
| | PCH-7F | 8.00 |
| | CCP-20CF3 | 8.00 |
| | CCP-30CF3 | 8.00 |
| | CCP-40CF3 | 8.00 |
| | CCP-50CF3 | 8.00 |
| | BCH-3F.F | 9.00 |
| | BCH-5F.F | 9.00 |

EXAMPLE 27

| | | |
|---|---|---|
| S→N [°C.] | <−40 | |
| Clearing point [°C.] | +105 | |
| Viscosity [mm²s⁻¹] 20° C. | 19 | |
| Viscosity [mm²s⁻¹] 0° C. | 57 | |
| Viscosity [mm²s⁻¹] −20° C. | 312 | |
| Viscosity [mm²s⁻¹] −30° C. | 941 | |
| Viscosity [mm²s⁻¹] −40° C. | 3828 | |
| Δn (589 nm, 20° C.) | +0.0914 | |
| $n_e$ (589 nm, 20° C.) | 1.5777 | |
| $V_{(10,0,20)}$ [V] | 2.10 | |
| $V_{(50,0,20)}$ [V] | 2.55 | |
| $V_{(90,0,20)}$ [V] | 3.15 | |
| Composition [%]: | PCH-5F | 7.00 |
| | PCH-6F | 7.00 |
| | PCH-30CF3 | 8.00 |
| | PCH-50CF3 | 8.00 |
| | ECCP-3F | 12.00 |
| | ECCP-5F | 12.00 |
| | BCH-3F.F | 11.00 |
| | BCH-5F.F | 11.00 |
| | ECCP-3F.F | 12.00 |
| | ECCP-5F.F | 12.00 |

EXAMPLE 28

| | | |
|---|---|---|
| S→N [°C.] | — | |
| Clearing point [°C.] | +83 | |
| Δn (589 nm, 20° C.) | +0.0903 | |
| $n_e$ (589 nm, 20° C.) | 1.5689 | |
| $V_{(10,0,20)}$ [V] | 1.88 | |
| $V_{(50,0,20)}$ [V] | 2.25 | |
| $V_{(90,0,20)}$ [V] | 2.76 | |
| Composition [%]: | PCH-5F | 5.00 |
| | PCH-6F | 13.00 |
| | PCH-7F | 7.00 |
| | CCP-20CF3 | 10.00 |
| | CCP-30CF3 | 11.00 |
| | CCP-40CF3 | 10.00 |
| | CCP-50CF3 | 12.00 |
| | BCH-3F.F | 12.00 |
| | BCH-5F.F | 12.00 |
| | CP-30CF3 | 4.00 |
| | CP-50CF3 | 4.00 |

EXAMPLE 29

| | | |
|---|---|---|
| S→N [°C.] | — | |
| Clearing point [°C.] | +102 | |
| Δn (589 nm, 20° C.) | +0.0939 | |
| $n_e$ (589 nm, 20° C.) | 1.5767 | |
| $V_{(10,0,20)}$ [V] | 2.18 | |
| $V_{(50,0,20)}$ [V] | 2.59 | |
| $V_{(90,0,20,)}$ [V] | 3.16 | |
| Composition [%]: | PCH-6F | 7.00 |
| | PCH-7F | 7.00 |
| | CCP-20CF3 | 6.00 |
| | CCP-30CF3 | 6.00 |
| | CCP-50CF3 | 4.00 |
| | CP-30CF3 | 7.00 |
| | CP-50CF3 | 6.00 |
| | ECCP-3F | 6.00 |
| | ECCP-5F | 4.00 |
| | ECCP-3F.F | 13.00 |
| | ECCP-5F.F | 11.00 |
| | BCH-3F.F | 12.00 |
| | BCH-5F.F | 11.00 |

EXAMPLE 30

| | | |
|---|---|---|
| S→N [°C.] | — | |
| Clearing point [°C.] | +103 | |

-continued

| | | |
|---|---|---|
| Δn (589 nm, 20° C.) | +0.0928 | |
| $n_e$ (589 nm, 20° C.) | 1.5752 | |
| $V_{(10,0,20)}$ [V] | 2.30 | |
| $V_{(50,0,20)}$ [V] | 2.70 | |
| $V_{(90,0,20)}$ [V] | 3.30 | |
| Composition [%]: | PCH-5F | 7.00 |
| | PCH-6F | 7.00 |
| | CP-30CF3 | 6.00 |
| | CP-50CF3 | 6.00 |
| | BCH-3F.F | 11.00 |
| | BCH-5F.F | 11.00 |
| | CCP-20CF3 | 6.00 |
| | CCP-30CF3 | 6.00 |
| | CCP-40CF3 | 4.00 |
| | CCP-50CF3 | 5.00 |
| | ECCP-3F.F | 10.00 |
| | ECCP-5F.F | 10.00 |
| | ECCP-3F | 6.00 |
| | ECCP-5F | 5.00 |

EXAMPLE 31

| | | |
|---|---|---|
| S→N [°C.] | — | |
| Clearing point [°C.] | +93 | |
| Δn (589 nm, 20° C.) | +0.0955 | |
| $n_e$ (589 nm, 20° C.) | 1.5845 | |
| $V_{(10,0,20)}$ [V] | 2.11 | |
| $V_{(50,0,20)}$ [V] | 2.52 | |
| $V_{(90,0,20)}$ [V] | 3.08 | |
| Composition [%]: | PCH-5F | 10.00 |
| | PCH-6F | 9.00 |
| | CP-30CF3 | 5.00 |
| | CP-50CF3 | 5.00 |
| | BCH-3F.F | 13.00 |
| | BCH-5F.F | 14.00 |
| | HP-30CF3 | 2.00 |
| | BCH-32 | 2.00 |
| | ECCP-3F.F | 10.00 |
| | ECCP-5F.F | 10.00 |
| | ECCP-3F | 10.00 |
| | ECCP-5F | 10.00 |

EXAMPLE 32

| | | |
|---|---|---|
| S→N [°C.] | <−40 | |
| Clearing point [°C.] | 96 | |
| Viscosity [mm²s⁻¹] 20° C. | 15 | |
| Viscosity [mm²s⁻¹] 0° C. | 41 | |
| Viscosity [mm²s⁻¹] −20° C. | 189 | |
| Viscosity [mm²s⁻¹] −30° C. | 581 | |
| Viscosity [mm²s⁻¹] −40° C. | 1882 | |
| Δn (589 nm, 20° C.) | 0.0940 | |
| $n_e$ (589 nm, 20° C.) | 1.5733 | |
| $V_{(10,0,20)}$ [V] | 2.08 | |
| $V_{(50,0,20)}$ [V] | 2.16 | |
| $V_{(90,0,20)}$ [V] | 3.01 | |
| Composition [%]: | PCH-5F | 10.00 |
| | PCH-6F | 8.00 |
| | PCH-7F | 6.00 |
| | CCP-20CF3 | 8.00 |
| | CCP-30CF3 | 12.00 |
| | CCP-40CF3 | 7.00 |
| | CCP-50CF3 | 11.00 |
| | BCH-3F.F | 12.00 |
| | BCH-5F.F | 10.00 |
| | CCP-30CF3 | 5.00 |
| | CCP-50CF3 | 5.00 |
| | CBC-33F | 2.00 |
| | CBC-53F | 2.00 |
| | CBC-53F | 2.00 |

EXAMPLE 33

| | | |
|---|---|---|
| S→N [°C.] | — | |
| Clearing point [°C.] | 96 | |
| Δn (589 nm, 20° C.) | 0.0923 | |
| $n_e$ (589 nm, 20° C.) | 1.5656 | |
| $V_{(10,0,20)}$ [V] | 1.52 | |
| $V_{(50,0,20)}$ [V] | — | |
| $V_{(90,0,20)}$ [V] | 2.33 | |
| Composition [%]: | PCH-5F | .00 |
| | PCH-7F | 5.00 |
| | CCP-20CF3 | 6.00 |
| | CCP-30CF3 | 6.00 |
| | CCP-50CF3 | 5.00 |
| | ECCP-3F.F | 5.00 |
| | BCH-3F.F | 4.00 |
| | BCH-5F.F | 4.00 |
| | CCP-20CF2.F.F | 17.00 |
| | CCP-30CF2.F.F | 19.00 |
| | CCP-50CF2.F.F | 21.00 |
| | CUP-3F.F | 4.00 |
| | CUP-5F.F | 4.00 |

EXAMPLE 34

| | | |
|---|---|---|
| S→N [°C.] | — | |
| Clearing point [°C.] | +106 | |
| Δn (589 nm, 20° C.) | +0.0928 | |
| $n_e$ (589 nm, 20° C.) | 1.5752 | |
| $V_{(10,0,20)}$ [V] | 2.42 | |
| $V_{(50,0,20)}$ [V] | 2.89 | |
| $V_{(90,0,20)}$ [V] | — | |
| Composition [%]: | PCH-5F | 7.00 |
| | PCH-6F | 7.00 |
| | CP-30CF3 | 10.00 |
| | CP-50CF3 | 10.00 |
| | BCH-3F.F | 11.00 |
| | BCH-5F.F | 11.00 |
| | CCP-20CF3 | 3.00 |
| | CCP-30CF3 | 3.00 |
| | CCP-40CF3 | 3.00 |
| | CCP-50CF3 | 3.00 |
| | ECCP-3F | 6.00 |
| | ECCP-5F | 6.00 |
| | ECCP-3F.F | 10.00 |
| | ECCP-5F.F | 10.00 |

EXAMPLE 35

| | | |
|---|---|---|
| S→N [°C.] | — | |
| Clearing point [°C.] | +103 | |
| Δn (589 nm, 20° C.) | +0.0932 | |
| $n_e$ (589 nm, 20° C.) | 1.5731 | |
| $V_{(10,0,20)}$ [V] | 2.11 | |
| $V_{(50,0,20)}$ [V] | 2.52 | |
| $V_{(90,0,20)}$ [V] | 3.07 | |
| Composition [%]: | PCH-6F | 7.00 |
| | PCH-7F | 6.00 |
| | CCP-20CF3 | 7.00 |
| | CCP-30CF3 | 7.00 |
| | CCP-40CF3 | 7.00 |
| | CCP-50CF3 | 7.00 |
| | CP-30CF3 | 6.00 |
| | CP-50CF3 | 6.00 |
| | ECCP-3F.F | 13.00 |
| | ECCP-5F.F | 11.00 |
| | BCH-3F.F | 12.00 |
| | BCH-5F.F | 11.00 |

EXAMPLE 36

| | |
|---|---|
| S→N [°C.] | — |
| Clearing point [°C.] | +100 |

-continued

| | | |
|---|---|---|
| Δn (589 nm, 20° C.) | +0.0924 | |
| n$_e$ (589 nm, 20° C.) | 1.5733 | |
| V$_{(10,0,20)}$ [V] | 2.06 | |
| V$_{(50,0,20)}$ [V] | 2.45 | |
| V$_{(90,0,20)}$ [V] | 2.96 | |
| Composition [%]: | PCH-6F | 7.00 |
| | PCH-7F | 8.00 |
| | CCP-20CF3 | 7.00 |
| | CCP-30CF3 | 7.00 |
| | CCP-40CF3 | 7.00 |
| | CCP-50CF3 | 7.00 |
| | ECCP-3F | 5.00 |
| | ECCP-5F | 3.00 |
| | ECCP-3F.F | 13.00 |
| | ECCP-5F.F | 11.00 |
| | BCH-3F.F | 10.00 |
| | BCH-5F.F | 4.00 |
| | HP-30CF3 | 6.00 |
| | HP-50CF3 | 5.00 |

EXAMPLE 37

| | | |
|---|---|---|
| S→N [°C.] | <−40 | |
| Clearing point [°C.] | 96 | |
| Viscosity [mm²s⁻¹] 20° C. | 15 | |
| Viscosity [mm²s⁻¹] 0° C. | 41 | |
| Viscosity [mm²s⁻¹] −20° C. | 189 | |
| Viscosity [mm²s⁻¹] −30° C. | 581 | |
| Viscosity [mm²s⁻¹] −40° C. | 1882 | |
| Δn (589 nm, 20° C.) | 0.0940 | |
| n$_e$ (589 nm, 20° C.) | 1.5733 | |
| V$_{(10,0,20)}$ [V] | 2.08 | |
| V$_{(50,0,20)}$ [V] | 2.16 | |
| V$_{(90,0,20)}$ [V] | 3.01 | |
| Composition [%]: | PCH-5F | 10.00 |
| | PCH-6F | 8.00 |
| | PCH-7F | 6.00 |
| | CCP-20CF3 | 8.00 |
| | CCP-30CF3 | 12.00 |
| | CCP-40CF3 | 7.00 |
| | CCP-50CF3 | 11.00 |
| | BCH-3F.F | 12.00 |
| | BCH-5F.F | 10.00 |
| | CP-30CF3 | 5.00 |
| | CP-50CF3 | 5.00 |
| | CBC-33F | 2.00 |
| | CBC-53F | 2.00 |
| | CBC-55F | 2.00 |

EXAMPLE 38

| | | |
|---|---|---|
| S→N [°C.] | — | |
| Clearing point [°C.] | +95 | |
| Δn (589 nm, 20° C.) | +0.0902 | |
| n$_e$ (589 nm, 20° C.) | 1.5774 | |
| V$_{(10,0,20)}$ [V] | 2.40 | |
| V$_{(50,0,20)}$ [V] | 2.84 | |
| V$_{(90,0,20)}$ [V] | 3.50 | |
| Composition [%]: | PCH-5F | 11.00 |
| | PCH-6F | 11.00 |
| | CP-30CF3 | 8.00 |
| | CP-50CF3 | 8.00 |
| | BCH-3F.F | 8.00 |
| | BCH-5F.F | 8.00 |
| | BCH-32 | 3.00 |
| | BCH-52 | 3.00 |
| | ECCP-3F.F | 10.00 |
| | ECCP-5F.F | 10.00 |
| | ECCP-3F | 10.00 |
| | ECCP-5F | 10.00 |

EXAMPLE 39

| | | |
|---|---|---|
| S→N [°C.] | — | |
| Clearing point [°C.] | +92 | |
| Δn (589 nm, 20° C.) | +0.0958 | |
| n$_e$ (589 nm, 20° C.) | 1.5859 | |
| V$_{(10,0,20)}$ [V] | 2.17 | |
| V$_{(50,0,20)}$ [V] | 2.61 | |
| V$_{(90,0,20)}$ [V] | 3.25 | |
| Composition [%]: | PCH-5F | 10.00 |
| | PCH-6F | 9.00 |
| | CP-30CF3 | 4.00 |
| | CP-50CF3 | 4.00 |
| | BCH-3F.F | 13.00 |
| | BCH-5F.F | 14.00 |
| | BCH-32 | 3.00 |
| | ECCP-3F.F | 11.00 |
| | ECCP-5F.F | 11.00 |
| | ECCP-3F | 11.00 |
| | ECCP-5F | 10.00 |

EXAMPLE 40

| | | |
|---|---|---|
| S→N [°C.] | — | |
| Clearing point [°C.] | +91 | |
| Δn (589 nm, 20° C.) | +0.0871 | |
| n$_e$ (589 nm, 20° C.) | 1.5758 | |
| V$_{(10,0,20)}$ [V] | 2.14 (1st) | |
| V$_{(50,3,20)}$ [V] | 2.59 | |
| V$_{(90,0,20)}$ [V] | 3.21 | |
| Composition [%]: | PCH-5F | 11.00 |
| | PCH-6F | 11.00 |
| | CP-3F | 8.00 |
| | CP-5F | 8.00 |
| | ECCP-3F | 7.00 |
| | ECCP-5F | 7.00 |
| | BCH-3F.F | 10.00 |
| | BCH-5F.F | 10.00 |
| | ECCP-3F.F | 14.00 |
| | ECCP-5F.F | 14.00 |

EXAMPLE 41

| | | |
|---|---|---|
| S→N [°C.] | — | |
| Clearing point [°C.] | +88 | |
| Δn (589 nm, 20° C.) | +0.0891 | |
| n$_e$ (589, nm, 20° C.) | 1.5754 | |
| V$_{(10,0,20)}$ [V] | 1.98 (1st) | |
| V$_{(50,0,20)}$ [V] | 2.39 | |
| V$_{(90,0,20)}$ [V] | 2.96 | |
| Composition [%]: | PCH-5F | 12.00 |
| | PCH-6F | 11.00 |
| | CP-3F | 9.00 |
| | CP-5F | 9.00 |
| | BCH-3F.F | 11.00 |
| | BCH-5F.F | 11.00 |
| | CCP-20CF3 | 3.00 |
| | CCP-30CF3 | 3.00 |
| | CCP-40CF3 | 3.00 |
| | CCP-50CF3 | 3.00 |
| | ECCP-3F.F | 13.00 |
| | ECCP-5F.F | 12.00 |

EXAMPLE 42

| | | |
|---|---|---|
| S→N [°C.] | — | |
| Clearing point [°C.] | 85 | |
| Δn (589 nm, 20° C.) | 0.089 | |
| n$_e$ (589 nm, 20° C.) | 1.569 | |
| V$_{(10,0,20)}$ [V] | 1.90 | |
| V$_{(50,0,20)}$ [V] | — | |
| V$_{(90,0,20)}$ [V] | 2.83 | |
| Composition [%]: | CP-30CF3 | 10.00 |

-continued

| | | |
|---|---|---|
| | PCH-5F | 9.00 |
| | PCH-6F | 7.20 |
| | PCH-7F | 7.20 |
| | CCP-20CF3 | 8.10 |
| | CCP-30CF3 | 8.10 |
| | CCP-40CF3 | 8.10 |
| | CCP-50CF3 | 8.10 |
| | ECCP-3F.F | 5.40 |
| | ECCP-5F.F | 5.40 |
| | BCH-3F.F | 11.70 |
| | BCH-5F.F | 11.70 |

EXAMPLE 43

| | | |
|---|---|---|
| S→N [°C.] | — | |
| Clearing point [°C.] | +107 | |
| Viscosity [mm²s⁻¹] 20° C. | 18 | |
| Viscosity [mm²s⁻¹] 0° C. | 53 | |
| Viscosity [mm²s⁻¹] −20° C. | 268 | |
| Viscosity [mm²s⁻¹] −30° C. | 782 | |
| Viscosity [mm²s⁻¹] −40° C. | 3174 | |
| Δn (589 nm, 20° C.) | +0.0956 | |
| $n_e$ (589 nm, 20° C.) | 1.5758 | |
| $V_{(10,0,20)}$ [V] | 2.00 | |
| $V_{(50,0,20)}$ [V] | 2.42 | |
| $V_{(90,0,20)}$ [V] | 2.97 | |
| Composition [%]: | PCH-5F | 6.00 |
| | PCH-6F | 6.00 |
| | CCP-20CF3 | 5.00 |
| | CCP-30CF3 | 6.00 |
| | CCP-40CF3 | 4.00 |
| | CCP-50CF3 | 5.00 |
| | BCH-3F.F | 12.00 |
| | BCH-5F.F | 12.00 |
| | ECCP-3F.F | 12.00 |
| | ECCP-5F.F | 12.00 |
| | CP-30CF3 | 10.00 |
| | CP-50CF3 | 10.00 |

EXAMPLE 44

| | | |
|---|---|---|
| S→N [°C.] | — | |
| Clearing point [°C.] | +104 | |
| Viscosity [mm²s⁻¹] 20° C. | 18 | |
| Viscosity [mm²s⁻¹] 0° C. | 53 | |
| Viscosity [mm²s⁻¹] −20° C. | 272 | |
| Viscosity [mm²s⁻¹] −30° C. | 789 | |
| Viscosity [mm²s⁻¹] −40° C. | 3010 | |
| Δn (589 nm, 20° C.) | +0.0954 | |
| $n_e$ (589 nm, 20° C.) | 1.5786 | |
| $V_{(10,0,20)}$ [V] | 2.09 | |
| $V_{(50,0,20)}$ [V] | 2.53 | |
| $V_{(90,0,20)}$ [V] | 3.13 | |
| Composition [%]: | PCH-5F | 6.00 |
| | PCH-6F | 6.00 |
| | CCP-20CF3 | 6.00 |
| | CCP-30CF3 | 5.00 |
| | CCP-40CF3 | 4.00 |
| | CCP-50CF3 | 5.00 |
| | BCH-3F.F | 12.00 |
| | BCH-5F.F | 12.00 |
| | ECCP-3F.F | 12.00 |
| | ECCP-5F.F | 12.00 |
| | ECCP-3F | 5.00 |
| | ECCP-5F | 5.00 |
| | CP-30CF3 | 5.00 |
| | CP-50CF3 | 5.00 |

EXAMPLE 45

| | | |
|---|---|---|
| S→N [°C.] | — | |
| Clearing point [°C.] | 109 | |
| Δn (589 nm, 20° C.) | 0.094 | |
| $n_e$ (589 nm, 20° C.) | 1.571 | |
| $V_{(10,0,20)}$ [V] | 2.18 | |
| $V_{(50,0,20)}$ [V] | — | |
| $V_{(90,0,20)}$ [V] | — | |
| Composition [%]: | CP-30CF3 | 10.00 |
| | CP-50CF3 | 10.00 |
| | PCH-5F | 8.00 |
| | PCH-6F | 6.40 |
| | PCH-7F | 4.80 |
| | CCP-20CF3 | 6.40 |
| | CCP-30CF3 | 9.60 |
| | CCP-40CF3 | 5.60 |
| | CCP-50CF3 | 8.80 |
| | BCH-3F.F | 9.60 |
| | BCH-5F.F | 8.00 |
| | ECCP-30CF3 | 4.00 |
| | ECCP-50CF3 | 4.00 |
| | CBC-33F | 1.60 |
| | CBC-53F | 1.60 |
| | CBC-55F | 1.60 |

EXAMPLE 46

| | | |
|---|---|---|
| S→N [°C.] | — | |
| Clearing point [°C.] | +100 | |
| Δn (589 nm, 20° C.) | +0.0944 | |
| $n_e$ (589 nm, 20° C.) | 1.5750 | |
| $V_{(10,0,20)}$ [V] | 1.94 | |
| $V_{(50,0,20)}$ [V] | 2.33 | |
| $V_{(90,0,20)}$ [V] | 2.87 | |
| Composition [%]: | PCH-5F | 10.00 |
| | PCH-6F | 9.00 |
| | CCP-20CF3 | 6.00 |
| | CCP-30CF3 | 7.00 |
| | CCP-40CF3 | 5.00 |
| | CCP-50CF3 | 7.00 |
| | BCH-3F.F | 8.00 |
| | BCH-5F.F | 8.00 |
| | ECCP-3F.F | 11.00 |
| | ECCP-5F.F | 11.00 |
| | CCP-30CF2.F.F | 5.00 |
| | CCP-50CF2.F.F | 4.00 |
| | CBC-33F | 5.00 |
| | CBC-55F | 4.00 |

EXAMPLE 47

| | | |
|---|---|---|
| S→N [°C.] | — | |
| Clearing point [°C.]: | +101 | |
| Δn (589 nm, 20° C.) | +0.0942 | |
| $n_e$ (589 nm, 20° C.) | 1.5769 | |
| $V_{(10,0,20)}$ [V] | 2.15 | |
| $V_{(50,0,20)}$ [V] | 2.56 | |
| $V_{(90,0,20)}$ [V] | 3.11 | |
| Composition [%]: | PCH-5F | 7.00 |
| | PCH-6F | 7.00 |
| | CUP-3F.F | 2.00 |
| | CCP-20CF3 | 6.00 |
| | CCP-30CF3 | 6.00 |
| | CCP-40CF3 | 5.00 |
| | CCP-50CF3 | 6.00 |
| | BCH-3F.F | 10.00 |
| | BCH-5F.F | 9.00 |
| | ECCP-3F.F | 11.00 |
| | ECCP-5F.F | 11.00 |
| | CCP-30CF2.F.F | 4.00 |
| | CCP-50CF2.F.F | 3.00 |
| | CP-30CF3 | 5.00 |
| | CP-50CF3 | 5.00 |
| | CBC-33F | 3.00 |

EXAMPLE 48

| | | |
|---|---|---|
| S→N [°C.] | — | |
| Clearing point [°C.] | 83 | |
| Δn (589 nm, 20° C.) | 0.093 | |
| $n_e$ (589 nm, 20° C.) | 1.574 | |
| $V_{(10,0,20)}$ [V] | 1.81 | |
| $V_{(50,0,20)}$ [V] | — | |
| $V_{(90,0,20)}$ [V] | — | |
| Composition [%]: | HP-30CF3 | 5.00 |
| | HP-50CF3 | 5.00 |
| | PCH-5F | 9.00 |
| | PCH-6F | 7.20 |
| | PCH-7F | 7.20 |
| | CCP-20CF3 | 8.10 |
| | CCP-30CF3 | 8.10 |
| | CCP-40CF3 | 8.10 |
| | CCP-50CF3 | 8.10 |
| | ECCP-3F.F | 5.40 |
| | ECCP-5F.F | 5.40 |
| | BCH-3F.F | 11.70 |
| | BCH-5F.F | 11.70 |

EXAMPLE 49

| | | |
|---|---|---|
| S→N [°C.] | — | |
| Clearing point [°C.] | 101 | |
| Δn (589 nm, 20° C.) | 0.0975 | |
| $n_e$ (589 nm, 20° C.) | 1.5797 | |
| $V_{(10,0,20)}$ [V] | 2.04 | |
| $V_{(50,0,20)}$ [V] | 2.42 | |
| $V_{(90,0,20)}$ [V] | 2.94 | |
| Composition [%]: | PCH-6F | 7.00 |
| | PCH-7F | 7.00 |
| | CCH-502 | 2.00 |
| | CCP-20CF3 | 6.00 |
| | CCP-30CF3 | 6.00 |
| | CCP-40CF3 | 6.00 |
| | CCP-50CF3 | 6.00 |
| | ECCP-3F.F | 11.00 |
| | ECCP-5F.F | 11.00 |
| | BCH-3F.F | 8.00 |
| | BCH-5F.F | 8.00 |
| | CUP-3F.F | 3.00 |
| | CUP-5F.F | 3.00 |
| | CCP-30CF2.F.F | 4.00 |
| | CCP-50CF2.F.F | 4.00 |
| | CBC-33F | 4.00 |
| | CBC-53F | 4.00 |

EXAMPLE 50

| | | |
|---|---|---|
| S→N [°C.] | — | |
| Clearing point [°C.] | +101 | |
| Viscosity [mm²s⁻¹] 20° C. | 17 | |
| Viscosity [mm²s⁻¹] 0° C. | 50 | |
| Viscosity [mm²s⁻¹] −20° C. | 230 | |
| Viscosity [mm²s⁻¹] −30° C. | Smectic | |
| Viscosity [mm²s⁻¹] −40° C. | — | |
| Δn (589 nm, 20° C.) | +0.0941 | |
| $n_e$ (589 nm, 20° C.) | 1.5733 | |
| $V_{(10,0,20)}$ [V] | 2.04 | |
| $V_{(50,0,20)}$ [V] | 2.49 | |
| $V_{(90,0,20)}$ [V] | 3.07 | |
| Composition [%]: | PCH-5F | 10.00 |
| | PCH-6F | 10.00 |
| | CCP-20CF3 | 6.00 |
| | CCP-30CF3 | 7.00 |
| | CCP-40CF3 | 5.00 |
| | CCP-50CF3 | 7.00 |
| | BCH-3F.F | 8.00 |
| | BCH-5F.F | 7.00 |
| | ECCP-3F | 2.00 |
| | ECCP-3F.F | 12.00 |
| | ECCP-5F.F | 12.00 |
| | CCP-30CF2.F.F | 3.00 |
| | CCP-50CF2.F.F | 3.00 |
| | CBC-33F | 4.00 |
| | CBC-53F | 4.00 |

EXAMPLE 51

| | | |
|---|---|---|
| S→N [°C.%] | — | |
| Clearing point [°C.] | +102 | |
| Viscosity [mm²s⁻¹] 20° C. | 16 | |
| Viscosity [mm²s⁻¹] 0° C. | 47 | |
| Viscosity [mm²s⁻¹] −20° C. | 222 | |
| Viscosity [mm²s⁻¹] −30° C. | 634 | |
| Viscosity [mm²s⁻¹] −40° C. | Sm | |
| Δn (589 nm, 20° C.) | +0.0876 | |
| $n_e$ (589 nm, 20° C.) | 1.5631 | |
| $V_{(10,0,20)}$ [V] | 2.10 (1st) | |
| $V_{(50,0,20)}$ [V] | 2.54 | |
| $V_{(90,0,20)}$ [V] | 3.11 | |
| Composition [%]: | PCH-5F | 8.00 |
| | PCH-6F | 8.00 |
| | CP-3F | 5.00 |
| | CP-5F | 5.00 |
| | BCH-3F.F | 7.00 |
| | BCH-5F.F | 7.00 |
| | CCP-20CF3 | 8.00 |
| | CCP-30CF3 | 7.00 |
| | CCP-40CF3 | 7.00 |
| | CCP-50CF3 | 7.00 |
| | ECCP-3F.F | 9.00 |
| | ECCP-5F.F | 8.00 |
| | CCP-30CF2.F.F | 7.00 |
| | CCP-50CF2.F.F | 7.00 |

EXAMPLE 52

| | | |
|---|---|---|
| PCH-5F | 5% | $T_{NI}$ 92° C. |
| PCH-7F | 6% | Δn 0.091 |
| CCP-30CF3 | 12% | $V_{10}$ 1.50 V |
| CCP-50CF3 | 11% | tilt angle ⊖ 3.7° |
| CCP-30CF3.F | 11% | |
| CCP-50CF3.F | 10% | |
| BCH-30CF3.F | 12% | |
| BCH-3F.F.F | 11% | |
| CCP-3F.F.F | 12% | |
| CCP-5F.F.F | 9% | |

EXAMPLE 53

| | | |
|---|---|---|
| PCH-5F.F | 11% | $T_{NI}$ 85° C. |
| CCP-3F.F | 12% | Δn 0.086 |
| CCP-5F.F | 11% | $V_{10}$ 1.45 V |
| CCP-3F.F.F | 11% | tilt angle ⊖ 3.8° |
| CCP-5F.F.F | 10% | |
| BCH-3F.F | 12% | |
| BCH-5F.F | 10% | |
| BCH-3F.F.F | 12% | |
| BCH-5F.F.F | 10% | |

EXAMPLE 54

| | | |
|---|---|---|
| EPCH-5F.F | 5% | $T_{NI}$ 88° C. |
| EPCH-7F.F | 6% | Δn 0.083 |
| CCP-3F.F | 10% | tilt angle ⊖ 4.3° |
| CCP-5F.F | 11% | |
| CCP-30CF3 | 12% | |
| CCP-50CF3 | 10% | |
| BCH-3F.F | 11% | |
| BCH-5F.F | 12% | |
| CCP-30CF2.F.F | 9% | |

| -continued | |
|---|---|
| CCP-5OCF2.F.F | 14% |

We claim:
1. A nematic liquid-crystal composition comprising:
8 to 70% by weight of one or more compounds from group 1:

group 1: 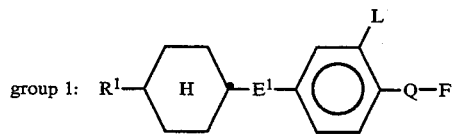

wherein
$R^1$ is a straight-chain alkyl group of 2 to 5 carbon atoms,
$E^1$ is

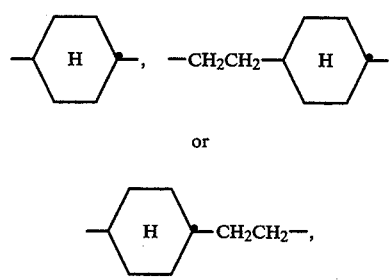

L is H or F, and
Q is $OCF_2$, OCFH, OCFCl or a single bond;
8 to 60% by weight of one or more compounds from group 2:

group 2: 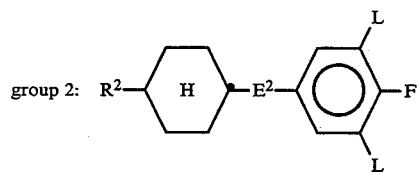

wherein
$R^2$ is a straight-chain alkyl group of 2 to 5 carbon atoms,
$E^2$ is

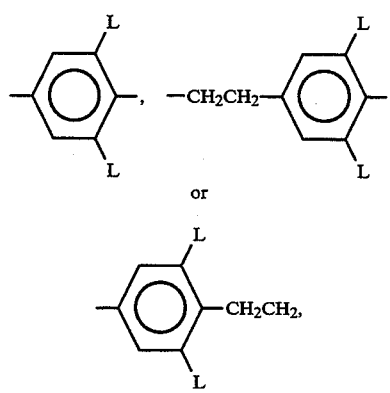

and
L, in each case, is H or F; and 8 to 40% by weight of one or more compounds from group 3 selected from formulae 3a–3f:

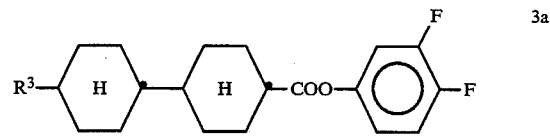 3a

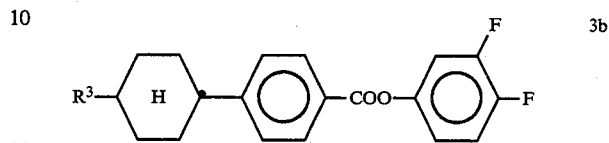 3b

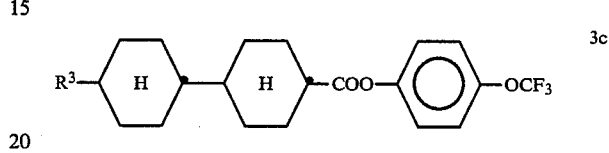 3c

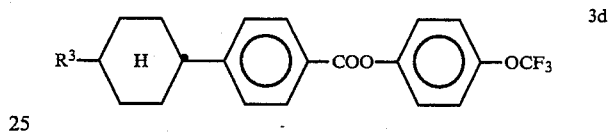 3d

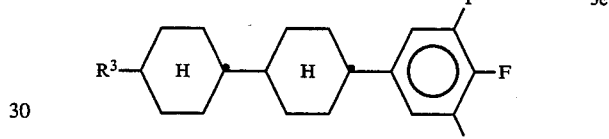 3e

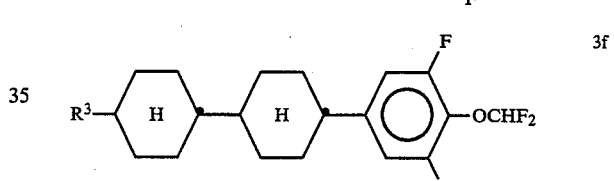 3f wherein
$R^3$ is a straight-chain alkyl group of 2 to 5 carbon atoms.

2. A nematic liquid-crystal composition according to claim 1, wherein said composition contains one or more compounds from each of groups 1 a and 1b:

group 1a: 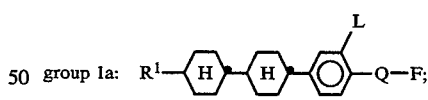

group 1b: 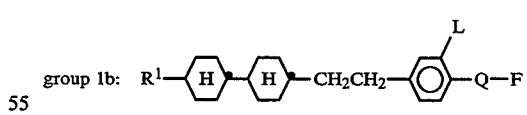

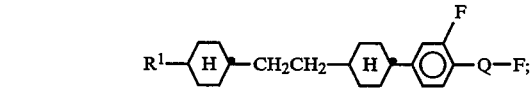

wherein
$R^1$ is a straight-chain alkyl group of 2 to 5 carbon atoms;
L is H or F; and
Q is $OCF_2$, OCFH, OCFCl or a single bond.

3. A nematic liquid-crystal composition according to claim 1, wherein said composition contains one or more compounds of the following formula:

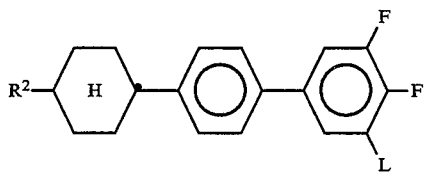

wherein

R² is a straight-chain alkyl group of 2 to 5 carbon atoms; and

L is H or F.

4. A nematic liquid crystal composition according to claim 2, wherein Q is a single bond and L is F.

5. A composition according to claim 1, wherein said composition contains more than 12% by weight of one or more compounds of group 1.

6. A composition according to claim 1, wherein said composition contains one or more compounds of group 1 wherein L is F and Q is a single bond.

7. A nematic liquid-crystal composition comprising:

8 to 70% by weight of one or more compounds from group 1:

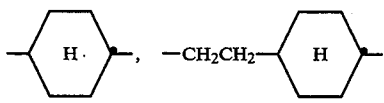

wherein

R¹ is a straight-chain alkyl group of 2 to 5 carbon atoms,

E¹ is

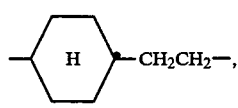

or

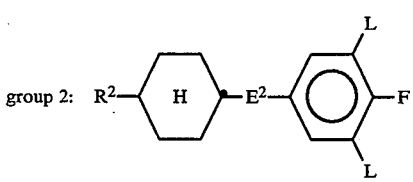

L is H or F, and

Q is $OCF_2$, OCFH, OCFCl or a single bond;

8 to 60% by weight of one or more compounds from group 2:

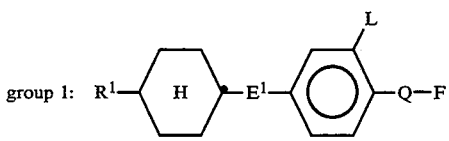

wherein

R² is a straight-chain alkyl group of 2 to 5 carbon atoms,

E² is

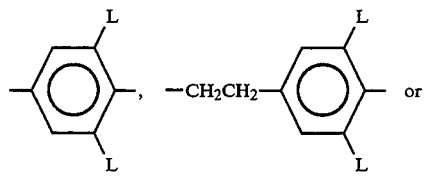

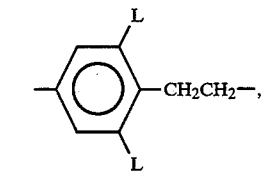

and

L, in each case, is H or F; and 8 to 40% by weight of one or more compounds from group 3 selected from formulae 3a–3f:

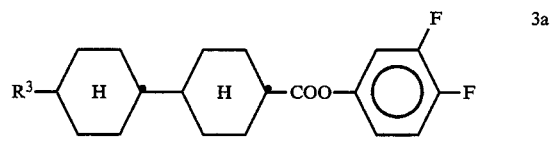

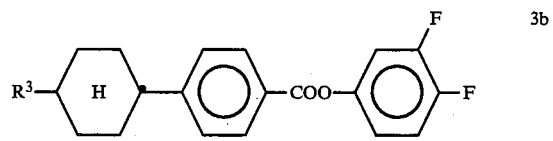

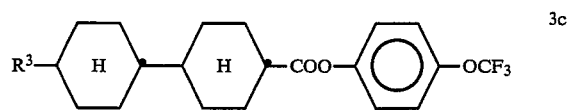

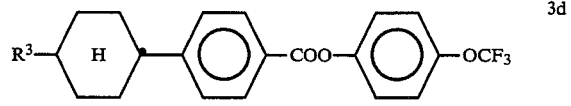

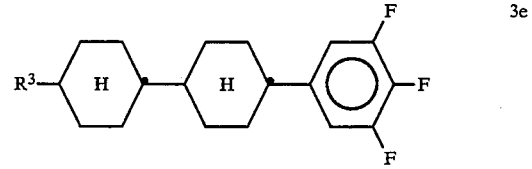

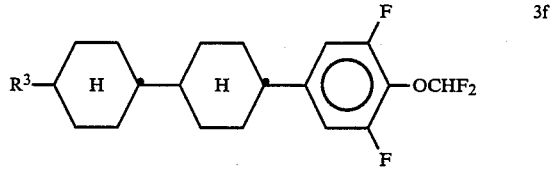

wherein

R³ is a straight-chain alkyl group of 2 to 5 carbon atoms; and wherein said composition contains one or more compounds of group 1 wherein Q is $OCF_2$, OCFH or OCFCl and L is H or F.

8. A nematic liquid-crystal composition comprising:

8 to 70% by weight of one or more compounds from group 1:

group 1: 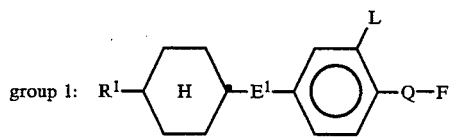

wherein

R¹ is a straight-chain alkyl group of 2 to 5 carbon atoms,

E¹ is

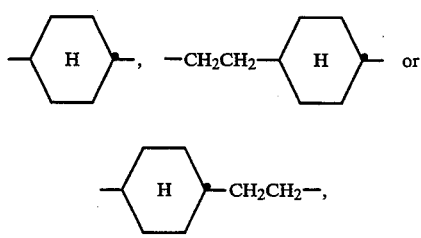

L is H or F, and

Q is $OCF_2$, OCFH, OCFCl or a single bond;

8 to 60% by weight of one or more compounds from group 2:

group 2: 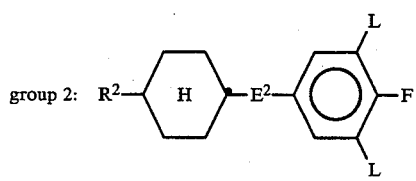

wherein

R² is a straight-chain alkyl group of 2 to 5 carbon atoms,

E² is

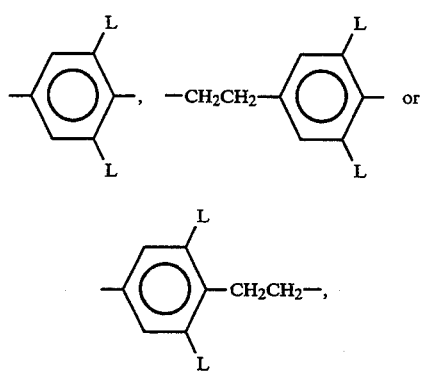

and

L, in each case, is H or F; and 8 to 40% by weight of one or more compounds from group 3 selected from formulae 3a–3f:

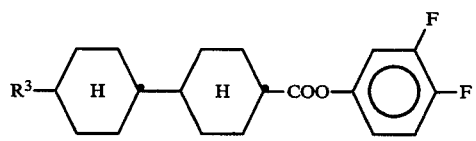

3a

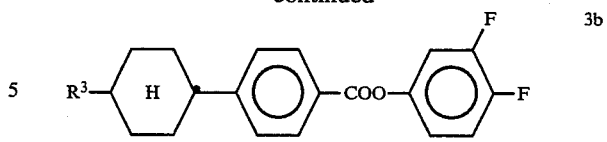

3b

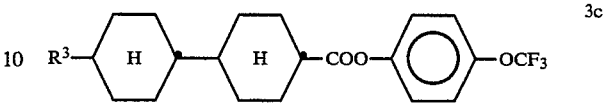

3c

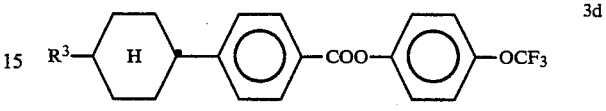

3d

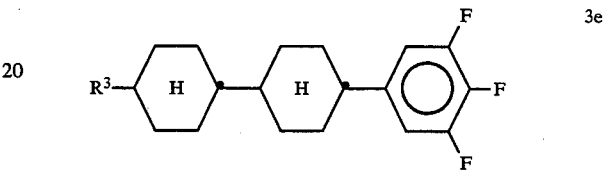

3e

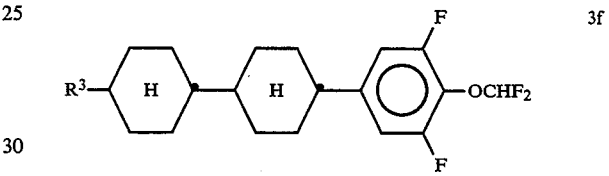

3f wherein

R³ is a straight-chain alkyl group of 2 to 5 carbon atoms; and said composition further comprises one or more compounds of group 0 group 0: 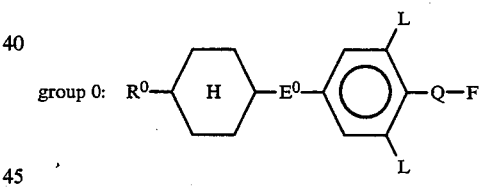

wherein

R⁰ is a straight-chain alkyl of 2 to 5 carbon atoms,

E⁰ is $-(CH_2)_4-$, $-(CH_2)_2-$, $-CO-O-$ or a single bond,

L is H or F, and

Q is $OCF_2$, OCFH, OCFCl, $CF_2$ or a single bond.

9. A composition according to claim 1, wherein said composition contains 30–60 wt. % of compounds of group 1.

10. A composition according to claim 1, wherein said composition contains 12–40% of compounds of group 2.

11. A composition according to claim 1, wherein said composition contains 12–30 wt. % of compounds of group 3.

12. A composition according to claim 8, wherein said composition contains 5–30% of compounds of group 0.

13. A composition according to claim 8, wherein said composition contains 5–30 wt. % of compounds of group 0, 30–60 wt. % of compounds of group 1, 12–40 wt. % of compounds of group 2, and 12–30 wt. % of compounds of group 3.

14. A composition according to claim 13, wherein said composition contains 10–25% of compounds of group 0, 35–55 wt. % of compounds of group 1, 15–25 wt. % of compounds of group 2, and 15–25 wt. % of compounds of group 3.

15. A composition according to claim 1, wherein said composition contains at least 60% of compounds of groups 1, 2 and 3.

16. A composition according to claim 1, wherein said composition contains 8–70 wt. % of compounds of group 1.

17. A composition according to claim 1, wherein said composition contains 8–60 wt. % of compounds of group 2.

18. A composition according to claim 1, wherein said composition contains 8–40 wt. % of compounds of group 3.

19. A composition according to claim 1, wherein said compositions contains 8–70 wt. % of compounds of group 1, 8–60 wt. % of compounds of group 2, and 8–40 wt. % of compounds of group 3.

20. A composition according to claim 7, wherein said composition comprises 8–70 wt. % of one or more compounds from group 1, 8–60 wt. % of one or more compounds from group 2, and 8–40 wt. % of one or more compounds from group 3.

21. A composition according to claim 8, wherein said composition comprises 8–70 wt. % of one or more compounds from group 1, 8–60 wt. % of one or more compounds from group 2, and 8–40 wt. % of one or more compounds from group 3.

22. A composition according to claim 7, wherein said composition further contains one or more compounds of group 1 wherein L is F and Q is a single bond.

23. A composition according to claim 22, wherein the weight ratio of compounds of group 1 wherein L is F and Q is a single bond to the compounds of group 1 wherein Q is OCF$_2$, OCFH or OCFCl and L is H or F is ≧1.

24. A composition according to claim 23, wherein said weight ratio is ≧2:1.

25. A composition according to claim 8, wherein said composition contains one or more compounds of group 0 wherein E$^0$ is —(CH$_2$)$_2$— or a single bond, Q is a single bond and one L group is H and the other L group is H or F.

26. A nematic liquid-crystal composition according to claim 6, wherein said composition contains one or more compounds from each of groups 1a and 1b:

group 1a: 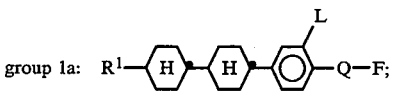

group 1b: 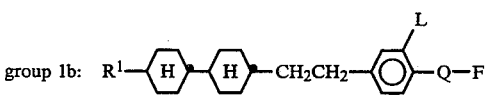

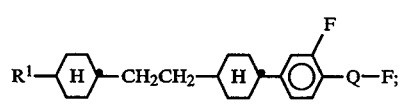

wherein
R$^1$ is a straight-chain alkyl group of 2 to 5 carbon atoms;
L is H or F; and
Q is OCF$_2$, OCFH, OCFCl or a single bond.

27. A nematic liquid-crystal composition comprising:
8 to 70% by weight of one or more compounds from group 1:

group 1: 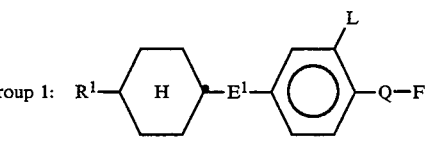

wherein
R$^1$ is a straight-chain alkyl group of 2 to 5 carbon atoms,
E$^1$ is

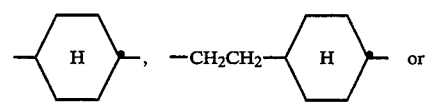

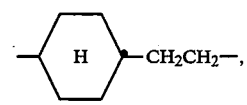

L is H or F, and
Q is OCF$_2$, OCFH, OCFCl or a single bond;
8 to 60% by weight of one or more compounds from group 2:

group 2: 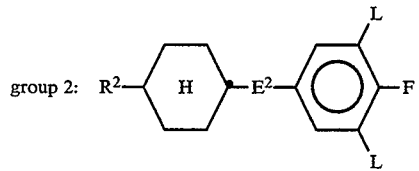

wherein
R$^2$ is a straight-chain alkyl group of 2 to 5 carbon atoms,
E$^2$ is

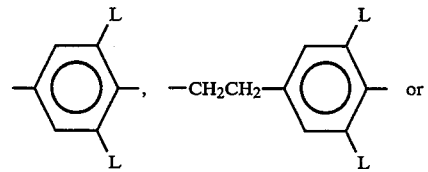

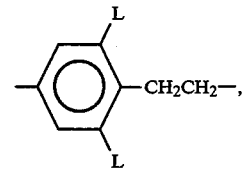

and
L, in each case, is H or F; and
said composition contains at least one compound of formulae 3a–3f

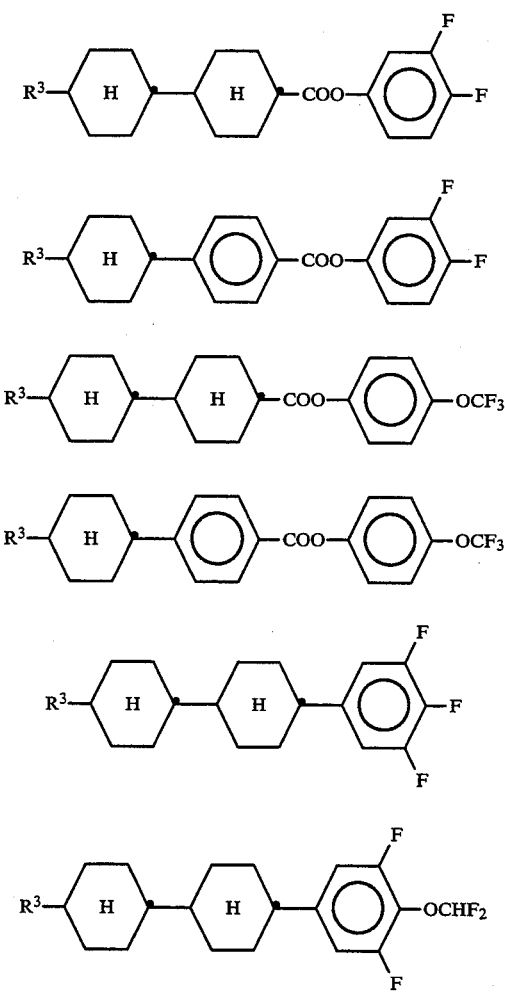

wherein
R³ is a straight-chain alkyl group of 2 to 5 carbon atoms.

28. A nematic liquid-crystal composition comprising:
8 to 60% by weight of one or more compounds from group 2:

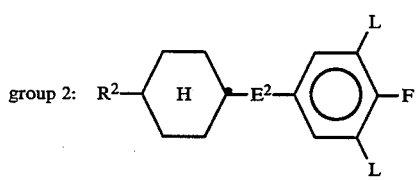

wherein
R² is a straight-chain alkyl group of 2 to 5 carbon atoms,
E² is

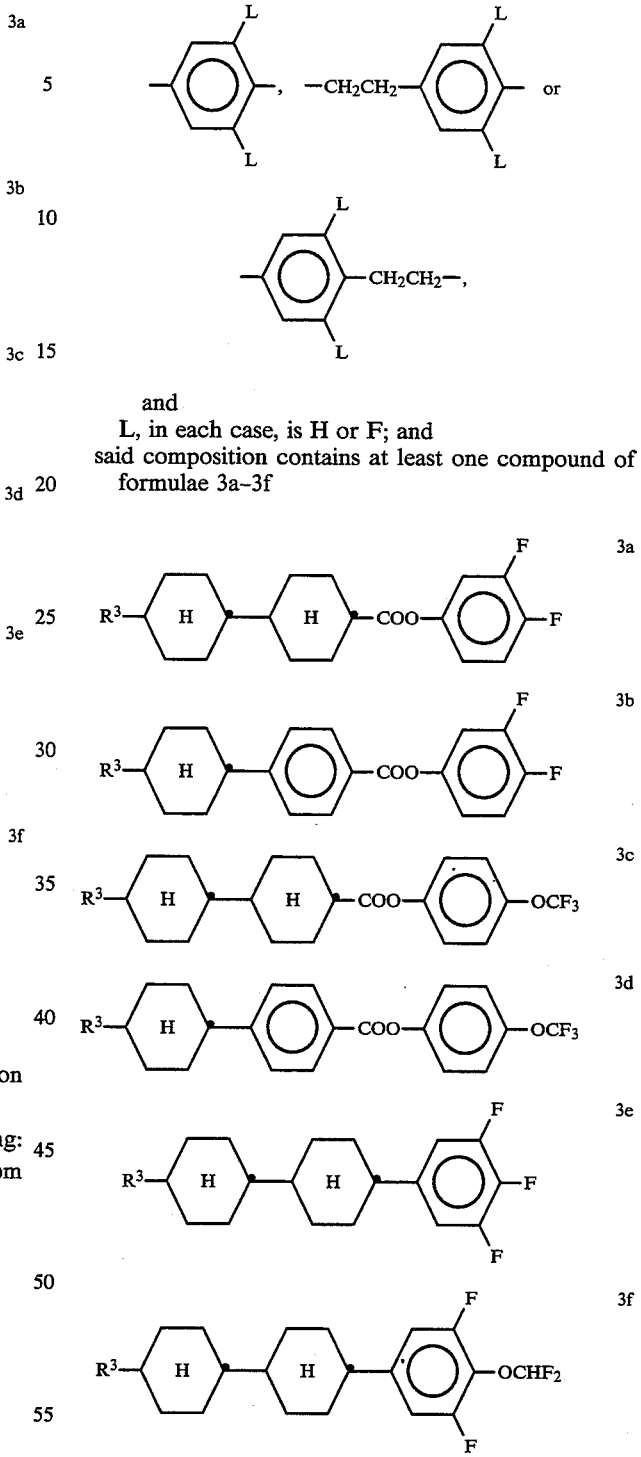

and
L, in each case, is H or F; and
said composition contains at least one compound of formulae 3a–3f wherein
R³ is a straight-chain alkyl group of 2 to 5 carbon atoms.

* * * * *